United States Patent
Nagaki et al.

(10) Patent No.: US 10,291,002 B2
(45) Date of Patent: May 14, 2019

(54) WIRE GRIPPER

(71) Applicant: NAGAKI SEIKI Co., Ltd., Daito-shi, Osaka (JP)

(72) Inventors: Takayuki Nagaki, Daito (JP); Tamotsu Iwama, Daito (JP)

(73) Assignee: NAGAKI SEIKI CO., LTD., Daito-Shi, Osaka (JP)

( * ) Notice: Subject to any disclaimer, the term of this patent is extended or adjusted under 35 U.S.C. 154(b) by 277 days.

(21) Appl. No.: 15/224,494

(22) Filed: Jul. 29, 2016

(65) Prior Publication Data

US 2016/0336724 A1 Nov. 17, 2016

Related U.S. Application Data

(63) Continuation of application No. PCT/JP2015/052280, filed on Jan. 28, 2015.

(30) Foreign Application Priority Data

Jan. 30, 2014 (JP) ................................. 2014-015849

(51) Int. Cl.
| | |
|---|---|
| *H02G 1/04* | (2006.01) |
| *H02G 1/06* | (2006.01) |
| *B25B 25/00* | (2006.01) |

(52) U.S. Cl.
CPC ............... *H02G 1/04* (2013.01); *B25B 25/00* (2013.01); *H02G 1/06* (2013.01)

(58) Field of Classification Search
CPC ............ H02G 1/04; H02G 1/005; H02G 1/00; H02G 1/06; B25B 25/00

USPC .................................................... 254/134.3 R
See application file for complete search history.

(56) References Cited

U.S. PATENT DOCUMENTS

| | | | | | |
|---|---|---|---|---|---|
| 2,140,837 | A | * | 12/1938 | Ross ......................... | H02G 1/02 24/134 N |
| 2,900,690 | A | * | 8/1959 | Suenram ................... | H02G 1/00 24/134 R |
| 2,985,933 | A | * | 5/1961 | Peterson ................. | H01R 11/15 24/132 R |

(Continued)

FOREIGN PATENT DOCUMENTS

| | | |
|---|---|---|
| JP | H02-41609 U | 3/1990 |
| JP | 2004-242477 A | 8/2004 |
| WO | WO-2011/001502 A1 | 1/2011 |

*Primary Examiner* — Christopher M Koehler
*Assistant Examiner* — Seahee Yoon
(74) *Attorney, Agent, or Firm* — Rabin & Berdo, P.C.

(57) ABSTRACT

A wire gripper having a lightweight feeling and enabling attaching work to a wire-like body to be performed easily and safely, which comprises: a fixed gripping body having a wire-like body pressing-down portion; a swinging member; a movable gripping body having a wire-like body holding portion; and a connection member coupled to the swinging member by a connection member swinging shaft and allowing the swinging member to swing. A wire gripper main body is provided with an first-finger hooking portion in a connection member guiding portion for guiding the connection member when pulling the connection member and attached with a grip portion in a freely swingably movable manner, on the side toward which the connection member is pulled, so that the grip portion faces the first-finger hooking portion. The grip portion is structured so as to be able to apply tension in order to pull the connection member.

3 Claims, 32 Drawing Sheets

(56) References Cited

U.S. PATENT DOCUMENTS

| | | | | |
|---|---|---|---|---|
| 3,262,171 | A * | 7/1966 | Scholz | F16G 11/105 24/134 R |
| 3,599,297 | A * | 8/1971 | Sievers | F16G 11/105 24/132 R |
| 8,540,215 | B2 * | 9/2013 | Iwama | B25B 25/00 24/134 R |
| 9,768,596 | B2 * | 9/2017 | Nagaki | H02G 1/06 |
| 2012/0000037 | A1 * | 1/2012 | Chen | B25G 1/10 24/134 N |
| 2012/0005863 | A1 * | 1/2012 | Chen | A62B 1/14 24/132 R |
| 2012/0005864 | A1 * | 1/2012 | Chen | F16G 11/101 24/132 WL |
| 2012/0132874 | A1 * | 5/2012 | Iwama | H02G 1/04 254/134.3 R |
| 2014/0054524 | A1 | 2/2014 | Iwama | |

* cited by examiner

Cross sectional surface A-A

Cross sectional surface B-B

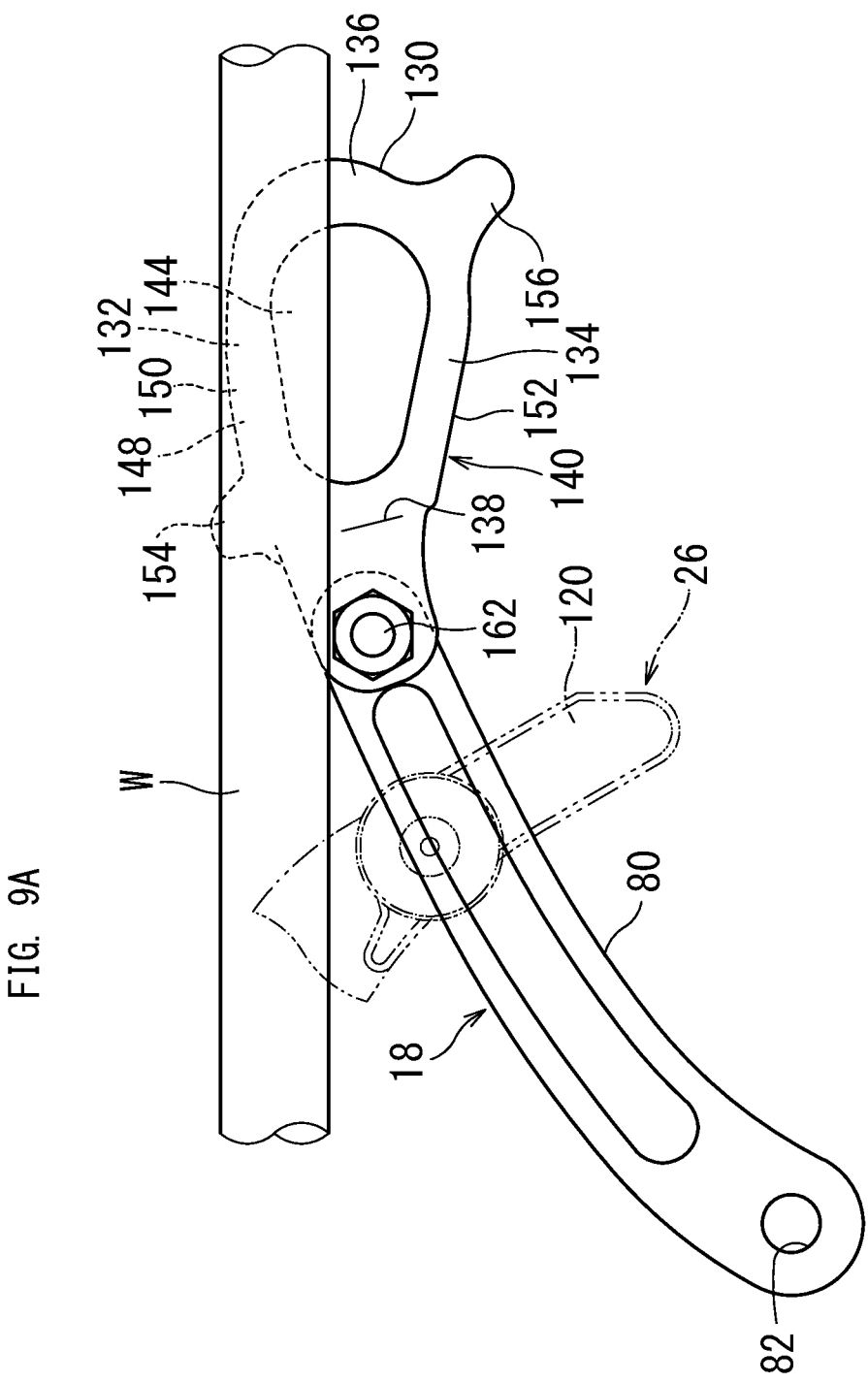

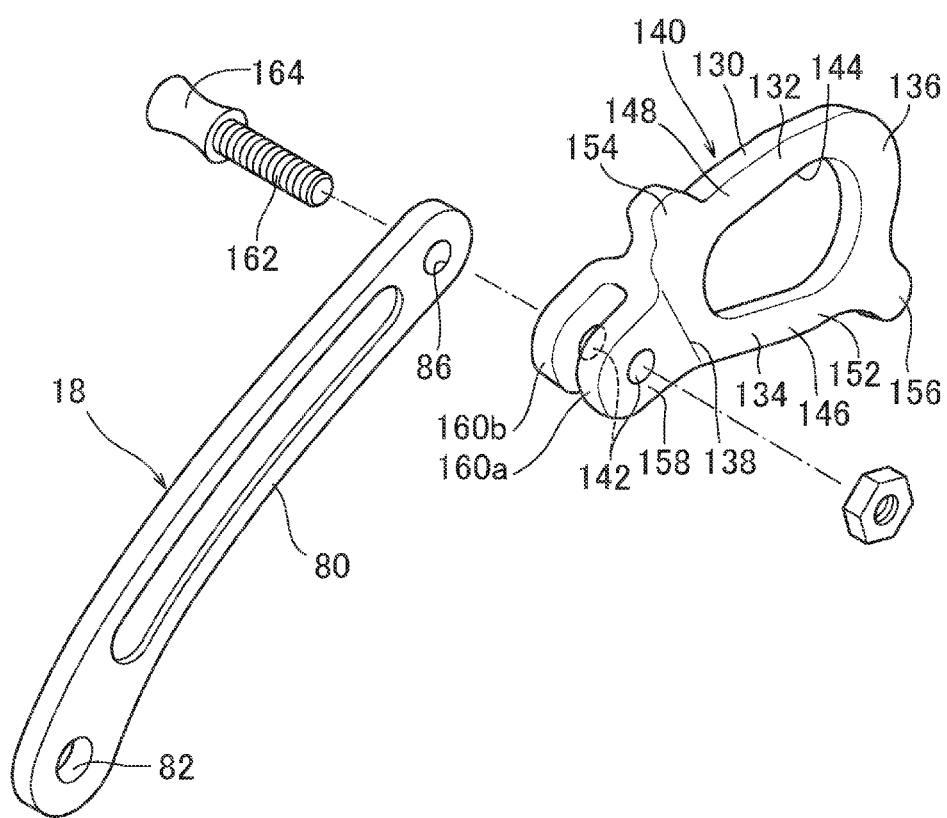

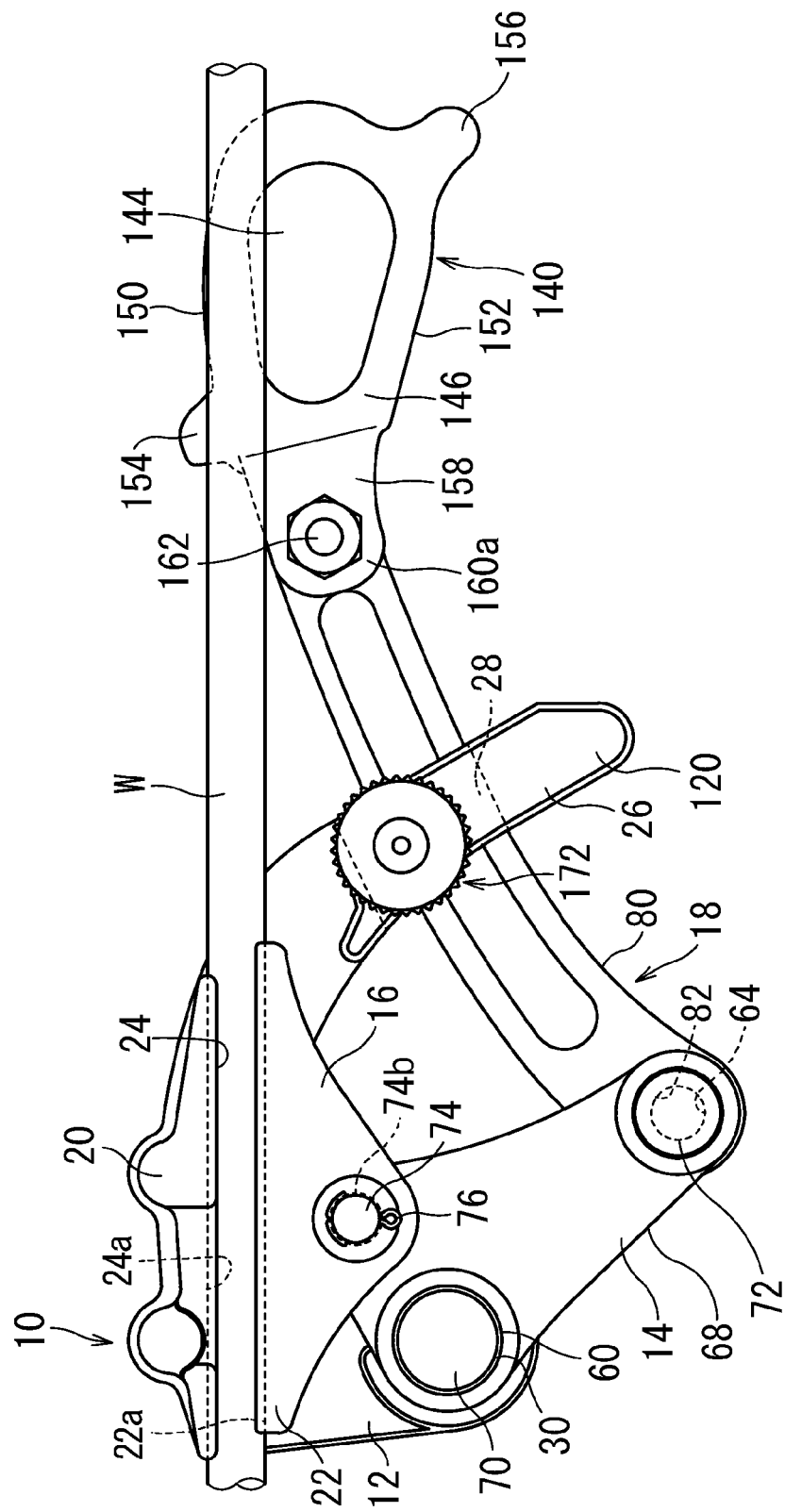

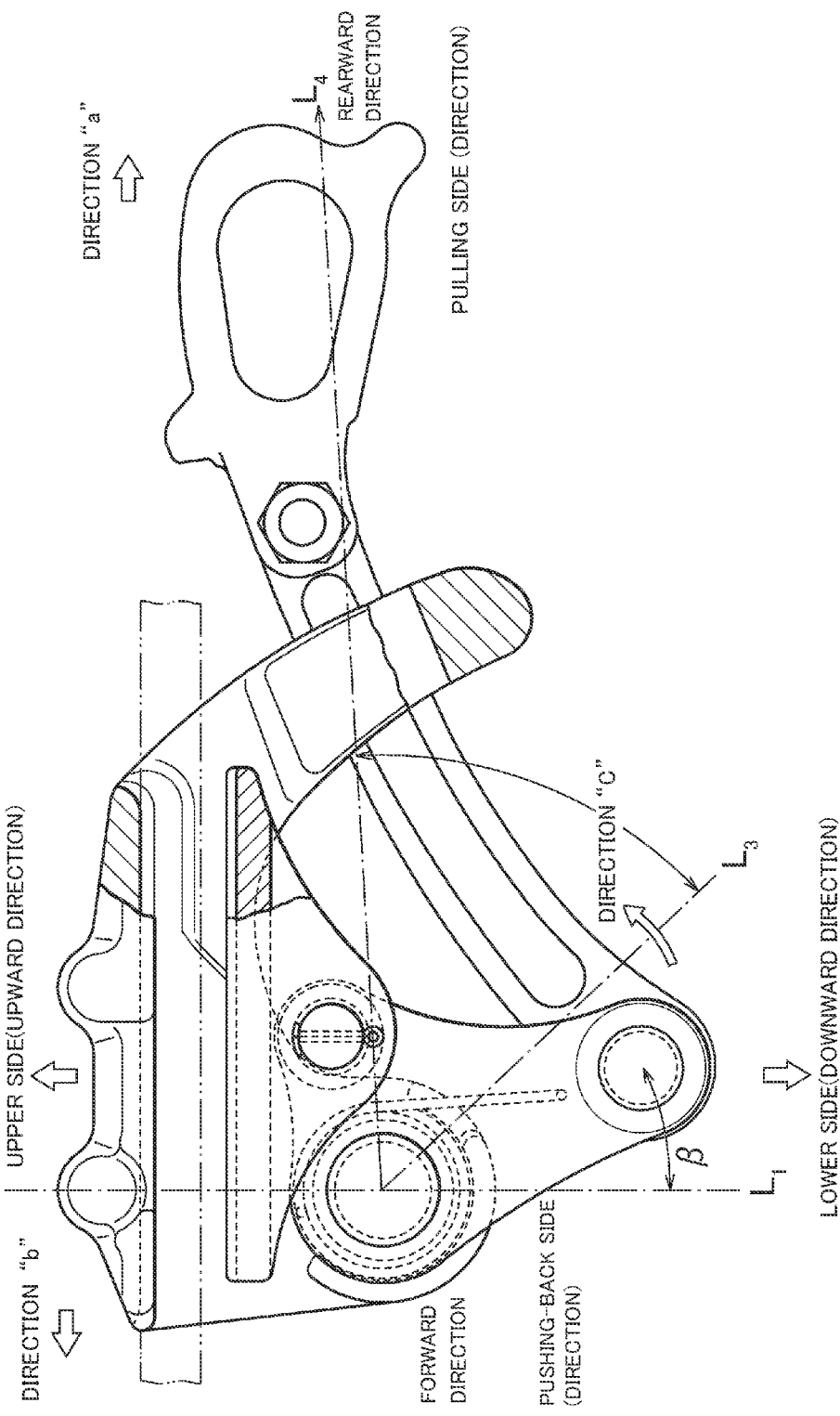

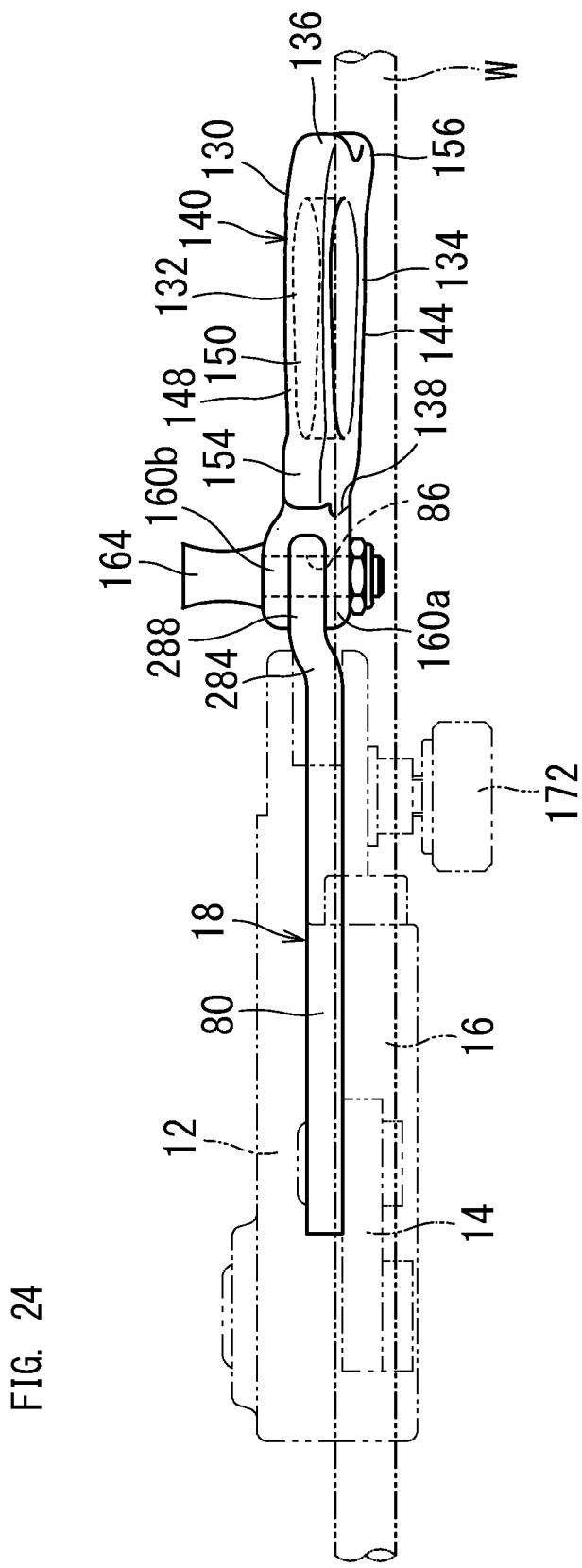

WIRE GRIPPER

This non-provisional application for a U.S. Patent is a Continuation of International Application PCT/JP2015/052280 filed on Jan. 28, 2015, which claims priority from JP 2014-015849 filed on Jan. 30, 2014, the entire contents of all of which are hereby incorporated by reference.

TECHNICAL FIELD

The present invention relates to a wire gripper which is attached to an apparatus for pulling a wire-like body, such as a wire, when a wire-allocating work or the like is performed and is used for an application for gripping a wire.

BACKGROUND ART

As conventional wire gripper used when a wire, an electric wire, a cable or the like is pulled and tensioned, for example, there are ones shown in Patent Documents 1 and 2.

For example, when a wire-allocating work is performed, a wire tensioner where wire grippes are coupled to both ends of a stretchable rod-like main body is used in order to cause loosening of a side to be subjected to a wire-allocating work by pulling a wire. The wire tensioner can loosen an intermediate portion of the wire gripped by the wire grippers on the both ends by shortening the length of the rod-like main body to shrink an interval between the wire grippers coupled to the both ends after the electric wire is gripped by the wire grippers on the both ends. The wire-allocating work can be performed easily by cutting the loosened electric wire at its required portion. As the conventional art gripping such an electric wire, the wire grippers shown in Patent Documents 1 and 2 are known.

PRIOR ART TECHNICAL DOCUMENT

Patent Document

Patent Document 1: PCT International Publication No. WO2011-001502
Patent Document 2: Japanese Patent Application Laid-Open No. 2004-242477

SUMMARY OF INVENTION

Problem to be Solved by the Invention

This wire gripper is subjected to excessive force, for example, shearing force at respective parts constituting the wire gripper when it holds tension of an overhead distribution line under construction.

Since attaching of the wire gripper to a wire-like body W is a high-place work performed to a wire way installed and also a dangerous work where contact with an active wire portion can occur, an action which can be conducted easily on the ground cannot be performed easily cannot be performed.

Since the work using the wire gripper is a dangerous work performed at a high place, a wire gripper which allows a work to be performed easily and safely is desired.

However, when respective portions of the wire gripper is made thick in order to increase robustness, a weight is increased, which results in difficulty in use of the wire gripper used at a high place.

Therefore, a primary object of the present invention is to provide a wire gripper which is reduced in weight and can be attached to a wire-like body easily and safely.

Means for Solving Problem

A wire gripper of the present invention described in claim 1 is a wire gripper comprising:
a stationary gripping body having a wire-like body pressing-down portion;
a swinging member swingably attached to a wire gripper main body by a supporting shaft;
a movable gripping body having a wire-like body holding portion and swinging toward the wire-like body pressing-down portion of the stationary gripping body according to swinging of the swinging member; and
a connection member coupled to the swinging member by a connection member swinging shaft and swinging the swinging member, wherein
the connection member is rotationally attached with a grip portion on a side of pulling, and
the grip portion has a shape grasped with a hand of a person, and is configured to extend in a direction in which the connection member extends when the connection member is pulled.

A wire gripper of the present invention described in claim 2 is a wire gripper comprising:
a stationary gripping body having a wire-like body pressing-down portion;
a swinging member swingably attached to a wire gripper main body by a supporting shaft;
a movable gripping body having a wire-like body holding portion and swinging toward the wire-like body pressing-down portion of the stationary gripping body according to swinging of the swinging member; and
a connection member coupled to the swinging member by a connection member swinging shaft and swinging the swinging member, wherein
the wire gripper main body is provided with a connection member guiding portion for guiding the connection member when the connection member is pulled,
the connection member guiding portion is provided with a first-finger hooking portion extending in a direction opposed to the stationary gripping body,
a grip portion is swingably attached to the side of pulling the connection member so as to be opposed to the first-finger hooking portion, and
the grip portion is configured so as to provide a tension for pulling the connection member.

A wire gripper of the present invention described in claim 3 is a wire gripper comprising:
a stationary gripping body having a wire-like body pressing-down portion;
a swinging member swingably attached to a wire gripper main body by a supporting shaft;
a movable gripping body having a wire-like body holding portion and swinging toward the wire-like body pressing-down portion of the stationary gripping body according to swinging of the swinging member; and
a connection member coupled to the swinging member by a connection member swinging shaft and swinging the swinging member, wherein
the wire gripper main body is provided with a connection member guiding portion for guiding the connection member when the connection member is pulled, and
the connection member and/or the connection member guiding portion is provided with a connection member suppressing mechanism for suppressing movement of the connection member by being fastened and/or being locked and/or being stopped in a pressing manner so as not to change a spacing between the wire-like body pressing-down portion of the stationary gripping body and the wire-like body holding portion of the movable gripping body.

It is preferable that the grip portion is provided with a length corresponding to a length of a palm of a human body, the first-finger hooking portion is provided with a length corresponding to a width of the first finger of the human body, and the grip portion is configured so as to hang from a side of the free end of the connection member toward a direction approximately equal to the first-finger hooking portion to be capable of be opposed to the first-finger hooking portion when the grip portion is gripped.

It is preferable that the grip portion is formed in an approximately egg shape and has a narrow region on the side of the attaching side to the connection member and a bulging free end region on the opposite side to the attaching side to the connection member, It is preferable that a thenar eminence abutting portion on which a thenar eminence of a palm of a hand of a human body abuts is formed at an end edge on the side opposed to the first-finger hooking portion, and a finger abutting portion on which a second finger and/or a third finger of the human body abut is formed on an end edge on the side opposed to the first-finger hooking portion.

It is preferable that the grip portion is formed with a thenar eminence abutting portion on which a thenar eminence of a palm of a hand of a human body abuts at an end edge on the side opposed to the first-finger hooking portion, and formed with a thumb abutting portion in a region on the connection member attaching side and formed with a finger abutting portion on which a second finger and/or a third finger of a human body abut on the side opposed to the first-finger hooking portion subsequently to the thenar eminence abutting portion, and formed with a small finger abutting portion in the region opposed to the connection member attaching side subsequently to the thumb abutting portion.

It is preferable that the connection member guiding portion is bored with a through-hole in which the connection member is inserted, and is provided with a connection member suppressing mechanism for suppressing returning of the connection member pulled toward the connection member.

It is preferable that the connection member suppressing mechanism has a pressing body provided so as to be freely advance/retract toward/from a main face side of the connection member, and a slope portion gradually protruding toward the pressing body side along a direction of the main face pressed by the pressing body toward the side of the coupling body pulled.

It is preferable that the connection member suppressing mechanism is configured such that a face of the connection member pressed by the pressing body, which is opposed to the main face of the connection member pressed by the pressing body is pressed against a hole wall face of the through-hole inserted with the connection member.

It is preferable that the grip portion is inclined to the main face of the connection member in the vicinity attached to the connection member and a region of the gripping portion on the side near a wire-like body W is located on the other side of the wire-like body W gripped between a stationary gripping body and a movable gripping body when the connection member is pulled.

Effect of Invention

According to the invention of claim 1, an attaching work to a wire-like body can be performed by gripping a grip portion with a hand. Therefore, a wire gripper which provides lightweight feeling and can perform an attaching work to a wire-like body easily and safely can be provided.

According to the invention of claim 2, an attaching work to a wire-like body can be performed by hooking a first finger to the first-finger hook and gripping the grip portion with the other hand. Therefore, a wire gripper which provides lightweight feeling and can perform an attaching work to a wire-like body easily and safely can be provided.

According to the invention of claim 3, a wire gripper which provides lightweight feeling and can perform an attaching work to a wire-like body easily and safely can be provided.

The above object, and other objects, features, and merits of the present invention will be made further apparent from explanation of an aspect for carrying out the invention made with reference to the drawings.

BRIEF DESCRIPTION OF THE DRAWINGS

FIG. 9A is a front illustration view of a connection member and a grip portion;

FIG. 9B is a perspective illustration view of a connection member and a grip portion;

FIG. 13B is a front illustration view showing a use stage of a wire gripper which is an embodiment;

FIG. 18A is an explanatory illustration view of a wire gripper;

FIG. 24 is a plan illustration view of a connection member and a grip portion.

MODE FOR CARRYING OUT THE INVENTION

Figure 1A:
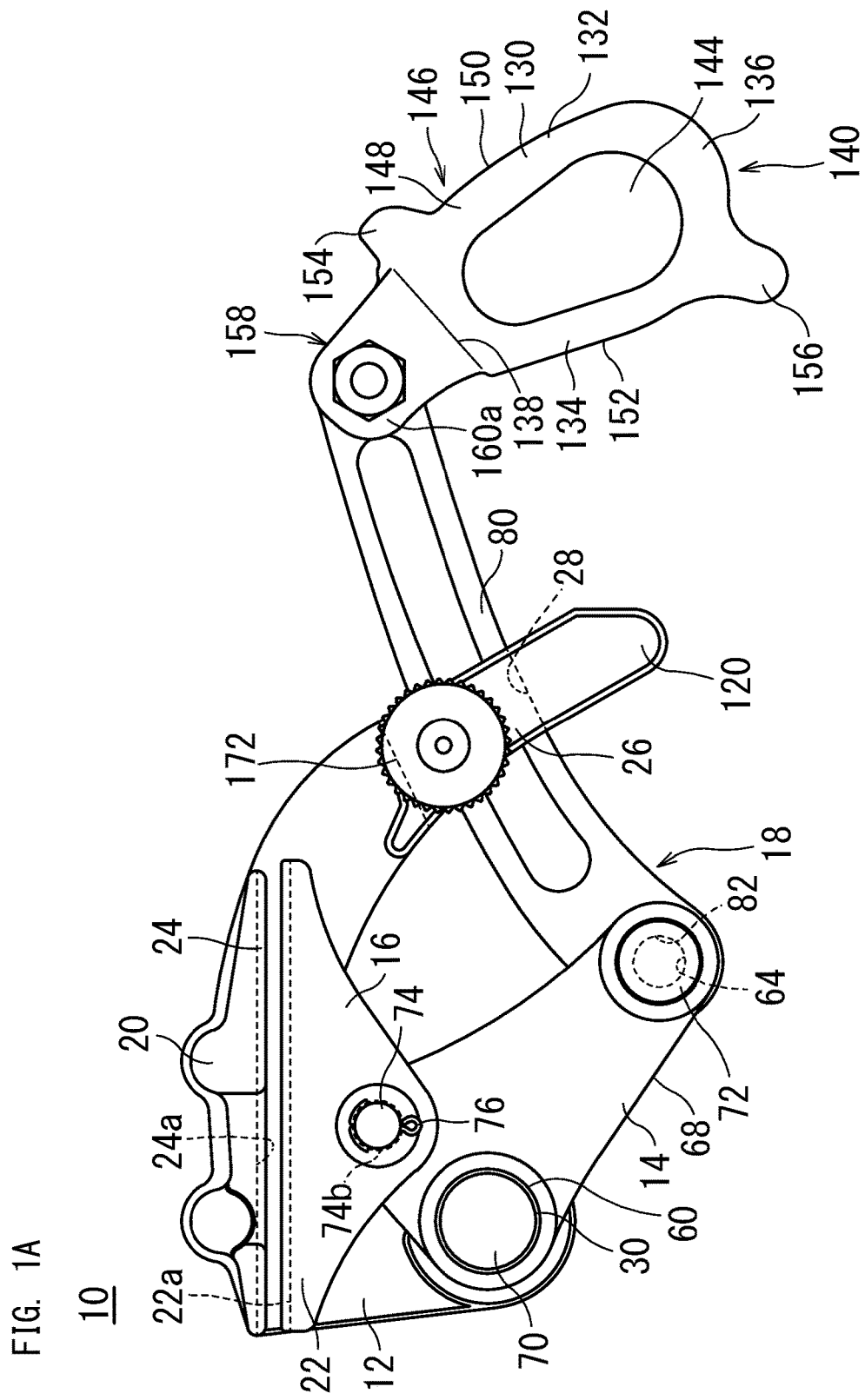
FIG. 1A is a front illustration view showing a whole configuration of a wire gripper which is an embodiment according to the present invention.

Embodiments of the present invention will be described below with reference to the drawings, and it will be submitted for understanding of the present invention. It should be noted that the embodiment described below is one embodied example and it does not limit the technical scope of the present invention.

A wire gripper 10 which is an embodiment of the present invention is provided with a wire gripper main body 12, a swinging member 14 attached to the wire gripper main body 12 swingably through a supporting shaft 70, a movable gripping body 16 swinging toward a wire-like body pressing-down portion 24 of a stationary gripping body 20 formed on the wire gripper main body 12 according to swinging of the swinging member 14 and having a wire-like body holding portion 22, and a connection member 18 coupled to the swinging member 14 and swinging the swinging member 14.

The wire gripper main body 12 is approximately U-shaped in a front view, and the wire gripper main body 12 has the stationary gripping body 20 provided at an upper portion of the wire gripper main body 12 so as to project toward the near side of the wire gripper main body 12. The wire gripper main body 12 has the wire-like body pressing-down portion 24 extending in a longitudinal direction of the wire gripper main body 12, the wire-like body pressing-down body 24 being formed on the stationary gripping body 20 provided so as to project toward the near side.

The wire gripper main body 12 has a connection member guiding portion 26 projecting downward and backward at a rear portion thereof.

The wire-like body pressing-down portion 24 of the stationary gripping body 20 is formed in an eaves shape protruded toward the near side of the gripper main body 12, and a lower face thereof is formed with a clamping groove 24a. The clamping groove 24a of the wire-like body pressing-down portion 24 is formed in parallel to a reference plane Pyz including a left and right axis which is a direction in which the stationary gripping body 20 and the movable gripping body 16 extend.

The connection member guiding portion 26 extends in parallel to an extension line of the wire-like pressing-down body 24 on an extension line where the wire-like body pressing-down portion 24 extends.

The connection member guiding portion 26 has a bored guide hole 28 allowing insertion of the connection member 18 to guide the same and it holds the connection member 18 rotatably pivoted to the swinging member 14, which has been inserted into the guide hole 28 which is a through-hole.

The stationary gripping body 20 of the wire gripper main body 12 is provided with a vertical face 56 forming a gripping hole portion 58 at a base portion 54 of the wire gripper main body 12. The wire-like body pressing-down portion 24 is provided so as to project toward the near side in a direction orthogonal to the vertical face 56 above the vertical face 56.

The clamping groove 24a of the wire-like body pressing-down portion 24 of the stationary gripping body 20 of the wire gripper main body 12 is opposed to a clamping groove 22a of the wire-like body holding portion 22 of the movable gripping body 16 gripping the wire-like body W and a gripping hole portion 58 gripping the wire-like body W between the gripping groove 24a and the gripping groove 22a.

The gripping hole portion 58 gripping the wire-like body W is formed in an approximately U shape or a channel shape surrounded by the clamping groove 24a of the wire-like body pressing-down portion 24 on an upper side, the clamping groove 22a of the wire-like body holding portion 22 on a lower side and the vertical face 56 of the wire-like body pressing-down portion 24 on the depth side.

The wire gripper main body 12 including the stationary gripping body 20 is provided with a supporting shaft hole 30 for pivoting the swinging member 14 by a supporting shaft 70 at a vertically-extending portion at the front portion so as to extend through the vertically-extending portion.

The supporting shaft hole 30 is a circular hole bored from a near side (a front face side) of the wire gripper main body 12 to a far side (a back face side) and it extends horizontally.

Another arc-shaped ridge 40 different from the ridge 32 is formed at a position separated from a hole edge of the supporting shaft hole 30 in which the supporting shaft 70 is inserted along the hole edge.

The arc-shaped ridge 40 is an arc-shaped rib in a front view provided continuously from the lower portion of the supporting shaft hole 30 to a front side thereof.

The ridge 40 projecting form the wire gripper main body 12 in a direction in which an outer peripheral edge of the hole of the supporting shaft hole 30 extends (in a direction in which the axial center 70a of the supporting shaft 70 extends).

The ridge 40 has a rear and lower portion notched [a direction of pulling the connection member 18 (a direction "a" shown in FIG. 18), so that a space 42 for allowing movement of a spring is provided.

The ridge 40 is configured so as to surround the ridge portion 32 in a circle concentric with the ridge 32 with an interval approximately equal from the outer circumferential edge of the ridge 32, and a spring groove 44 is formed between the ridge 40 and the ridge 32.

The ridge 40 has a top portion 40a formed in a flat shape and expands in a vertical direction which is a direction intersecting a direction in which the outer peripheral edge of the hole of the supporting shaft hole 30 extends. The ridge 40 has an approximately sectional trapezoid where the top portion 40a includes a near side face of the wire gripper main body 12 and a flat face parallel to the clamping groove 24a of the wire-like body pressing-down portion 24 and a circumferential edge thereof extending in a direction intersecting the near side of the wire gripper main body 12.

The ridge 40 has a height approximately equal to that of the ridge 32, the height of the ridge 40 has a length approximately equal to a width of the wire gripper main body 12, and the ridge 40 has an approximately equal sectional shape and has an approximately equal height over the whole circumference thereof.

The ridge 40 is tapered such that a width thereof gradually becomes narrower toward the upper end (the top portion 40a), and a width of a lower end portion thereof is approximately equal to the width of the wire gripper main body 12.

The ridge 40 constitutes a seat on which the swinging member 14 is placed.

The ridge 40 is formed integrally with the wire gripper main body 12 from a metal.

The swinging member 14 has an approximately triangular shape in a front view, and it is configured such that an inner angle portion at a front upper portion thereof is bored with a stationary gripping body attaching hole 60 in which the supporting shaft 70 is inserted, an inner angle portion at a rear upper portion thereof is bored with a movable gripping body attaching hole 62 in which a movable gripping body swinging shaft 74 is inserted, and an inner angle portion at a rear lower portion thereof is bored with a connection member attaching hole 64 in which a connection member swinging shaft 72 is inserted.

The swinging member 14 includes a front end edge 68 reaching the vicinity of the connection member attaching hole 64 from the vicinity of the supporting shaft hole 30 between the supporting shaft hole 30 in which the supporting shaft 70 to which the wire gripper main body 12 provided with the stationary gripping body 20 is attached is inserted and the connection member attaching hole 64 in which the connection member swinging shaft 72 to which the connection member 18 is attached is inserted. The front end edge 68 of the swinging member 14 is gradually inclined toward a backward direction (counterclockwise) which is a direction in which the connection member 18 extends along a direction from the supporting shaft hole 30 positioned above toward the side of the connection member attaching hole 64 positioned below.

The connection member swinging shaft 72 and the movable gripping body swinging shaft 74 are located on a rear side which is a direction in which the connection member 18 extends (on the right side) beyond the supporting shaft 70, the connection member swinging shaft 72 is located below the supporting shaft 70, the movable gripping body swinging shaft 74 is located above the supporting shaft 70, and the connection member 18 is located above the connection member swinging shaft 72 and extends downward beyond the wire-like body pressing-down portion 24 of the stationary gripping body 20.

The connection member 18 is a rod-like body having a longitudinal direction, a swinging member attaching hole 82 is bored at a front portion of the connection member main body 80 formed in a sectional I shape, and a grip portion 140 is rotatably attached to a rear portion of the connection member main body 80.

The connection member attaching hole 64 of the swinging member 14 and the swinging member attaching hole 82 of the connection member 18 have the same diameter and they are arranged in parallel such that the outer circumferential edges of the holes thereof are parallel. Further, the connection member 18 is rotatably attached to the swinging member 14 by a connection member swinging shaft 72 inserted into the wire gripper main body 12 from the connection member attaching hole 64 of the swinging member 14 into the swinging member attaching hole 82 of the connection member 18.

The guide hole 28 of the connection member guiding portion 26 is formed at approximately the same height as the supporting shaft hole 30, and the stationary gripping body attaching hole 60 of the swinging member 14 is formed at approximately the same height as the supporting shaft hole 30 of the stationary gripping body 20 and the guide hole 28. Therefore, the connection member 18 attached to the connection member attaching hole 64 formed below the stationary gripping body attaching hole 60 of the swinging member 14 is inserted into the guide hole 28 of the connection member guiding portion 26 to rise toward the side of pulling the connection member 18 (the direction "a" shown in FIG. 18).

The connection member 18 may contact with a peristome of the guide hole 28 on the side pulling the connection member 18 (the direction "a" shown in FIG. 18) which is the side separate from the supporting shaft hole 30 such that a force acting on the connection member main body 80 of the connection member 18 becomes small.

A biasing member 110 composed of a coil spring for biasing the swinging member 14 to the side where the connection member 18 is pulled is provided between the wire gripper main body 12 including the stationary gripping body 20 and the swinging member 14.

The biasing member 110 is arranged such that a coil portion 112 thereof is fitted into a spring groove 44 of the wire gripper main body 12 including the stationary gripping body 20.

The biasing member 110 is arranged such that a linear first hooking portion 114 extending from the coil portion 112 on the near side is fixed to a catching hole 66 of the swinging member 14 formed on the far-side face, and a linear second hooking portion 116 extending from the coil portion 112 on the far side is fixed to a catching hole 48 of the wire gripper main body 12 including the stationary gripping body 20 formed on the near-side face.

Figure 18B:
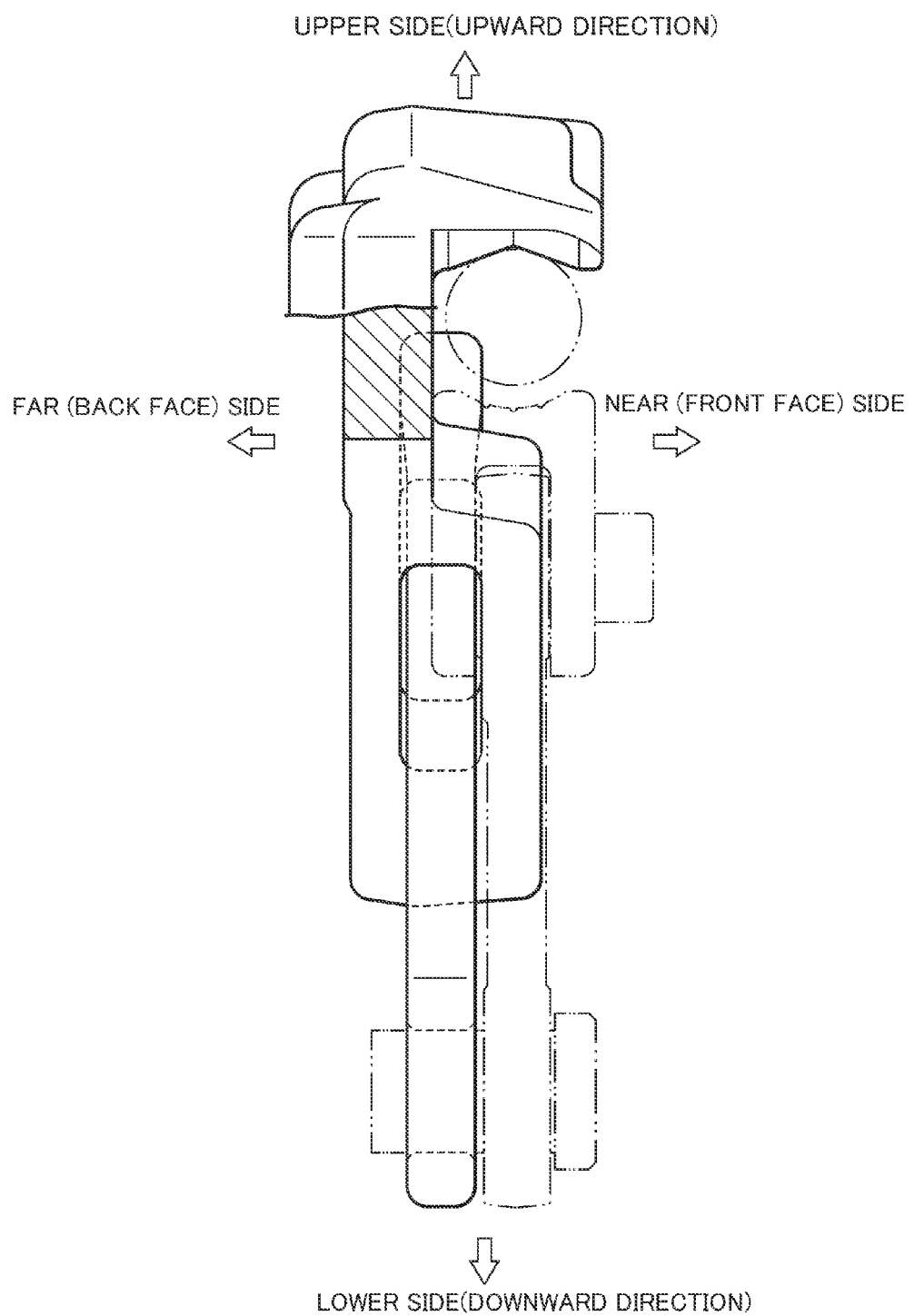
FIG. 18B is an explanatory illustration view of a wire gripper.
Figure 19:
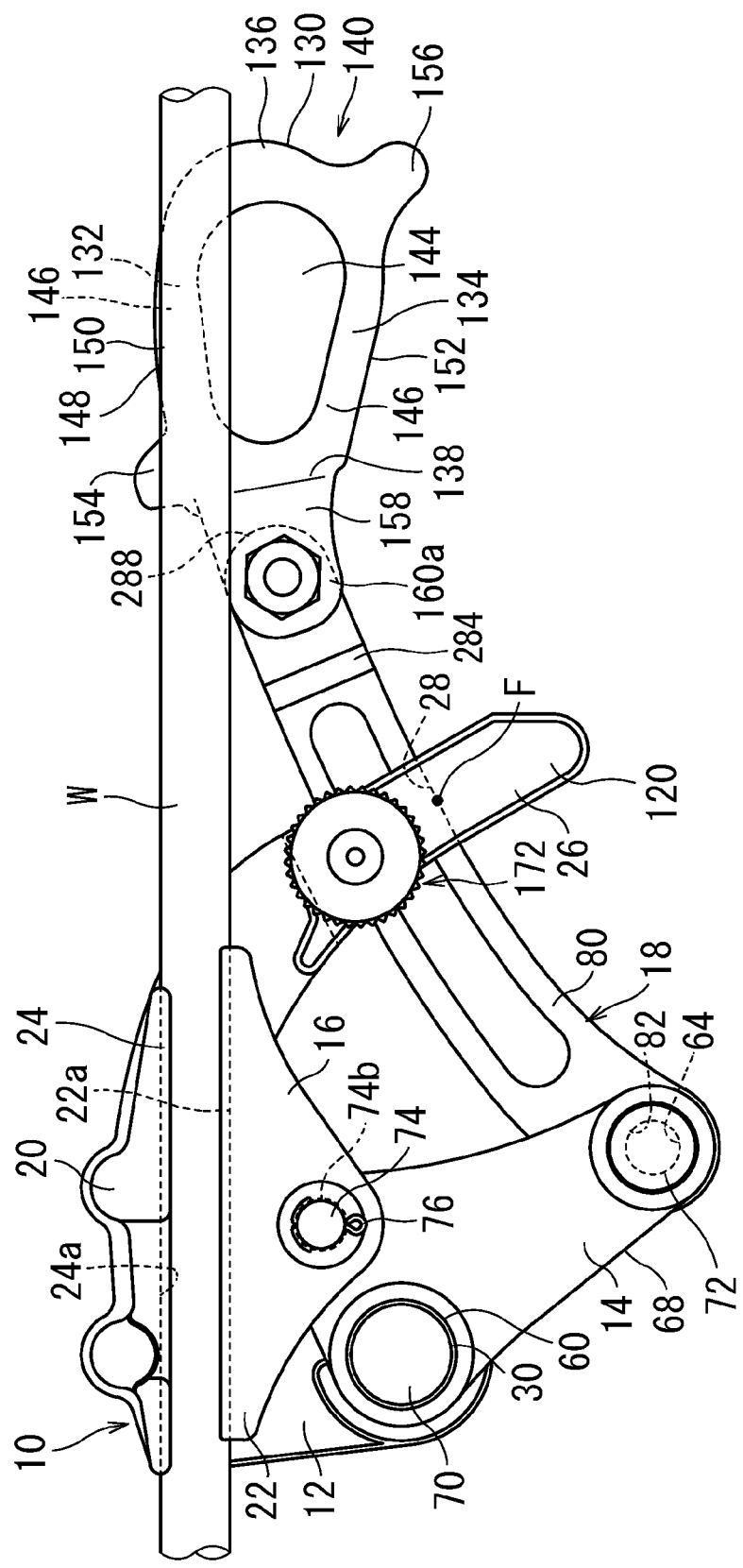
FIG. 19 is a front illustration view showing a whole configuration of a wire gripper which is an embodiment according to the present invention.
Figure 20:
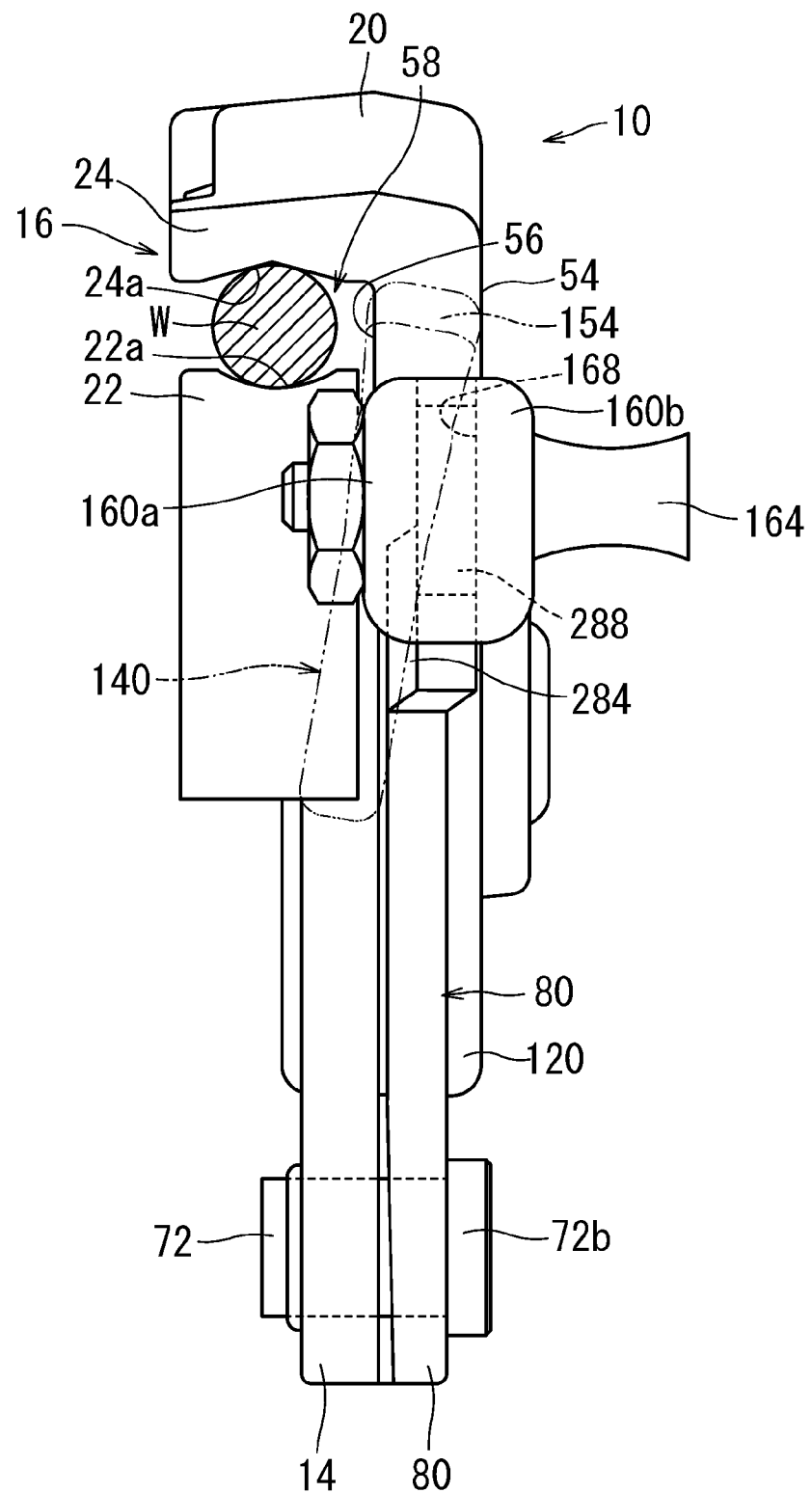
FIG. 20 is a right side illustration view of a wire gripper main body.
Figure 21A:
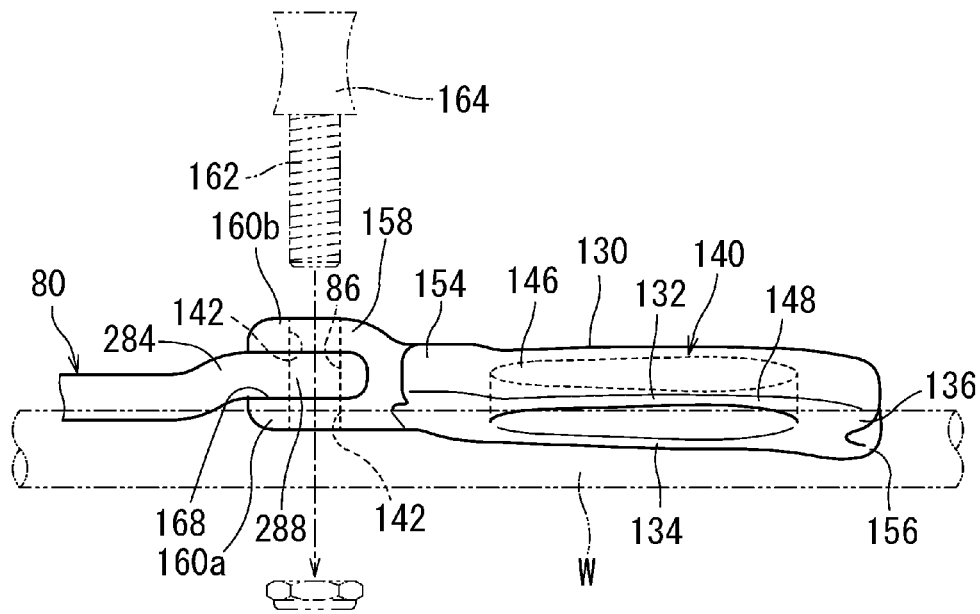
FIG. 21A is a plan illustration view of a grip portion.
Figure 21B:
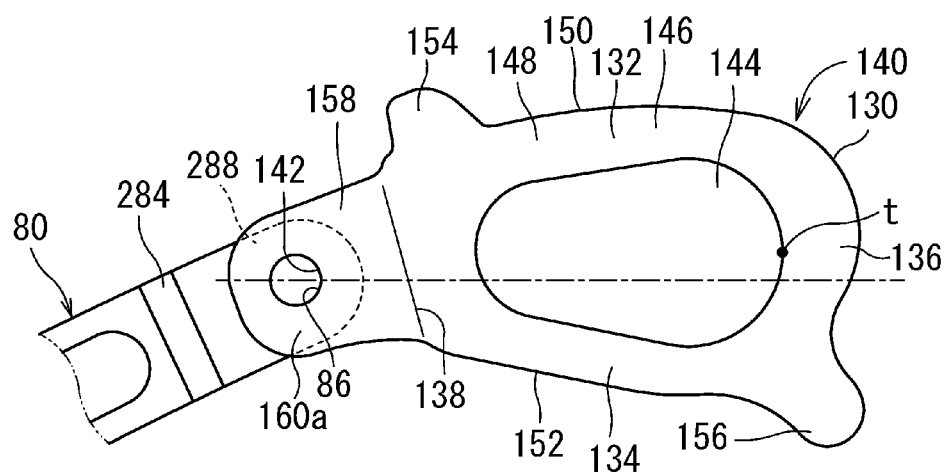
FIG. 21B is a front illustration view of a grip portion.
Figure 22:
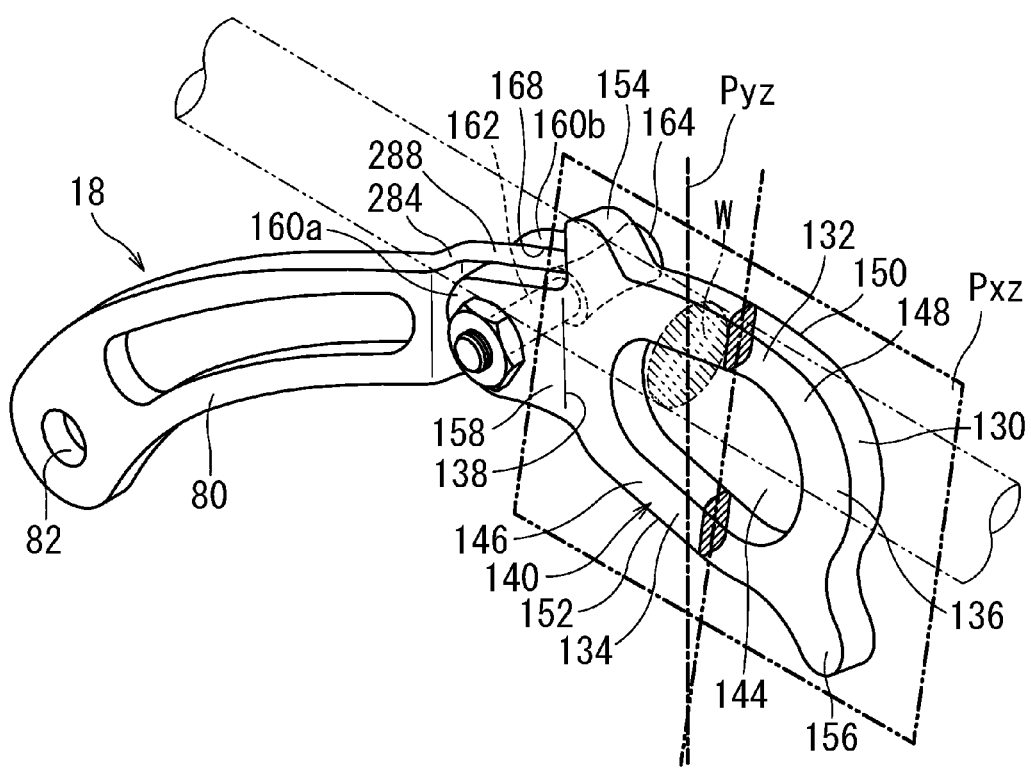
FIG. 22 is a perspective illustration view of a grip portion of a wire gripper.
Figure 23A:
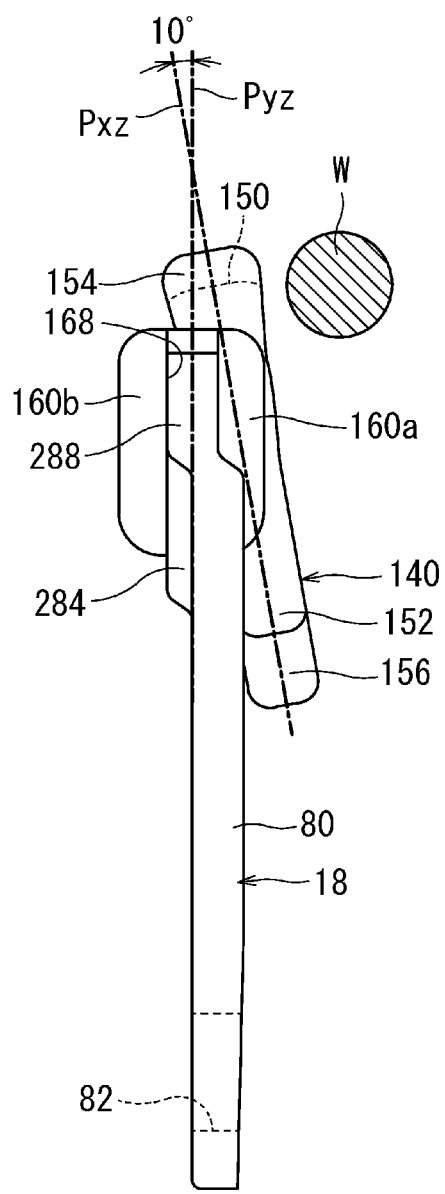
FIG. 23A is a side face illustration view of the wire gripper.
Figure 23B:
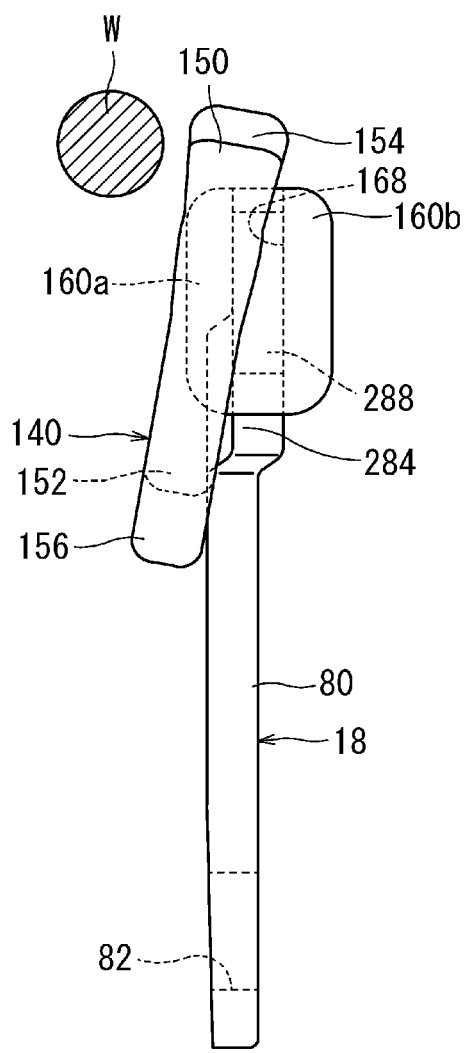
FIG. 23B is a side face illustration view of the wire gripper.

The first hooking portion 114 is fixed in the catching hole 66 of the swinging member 14 in a state where the connection member 18 has been pulled in a non-loaded state, and the biasing member 110 biases the connection member 18 in such a state that the connection member 18 has been pulled from a side of pushing back the connection member 18 in a pulling-back direction (the direction "b" shown in FIG. 18 to a side of pulling the connection member 18 (the direction "a" shown in FIG. 18).

The ridge 40 of the wire gripper main body 12 including the stationary gripping body 20 is not formed within an operation range of the first hooking portion 114, it is provided with a space 42, and it is provided so as to extend from a lower portion of the supporting shaft hole 30 to a front portion thereof.

Figure 5:
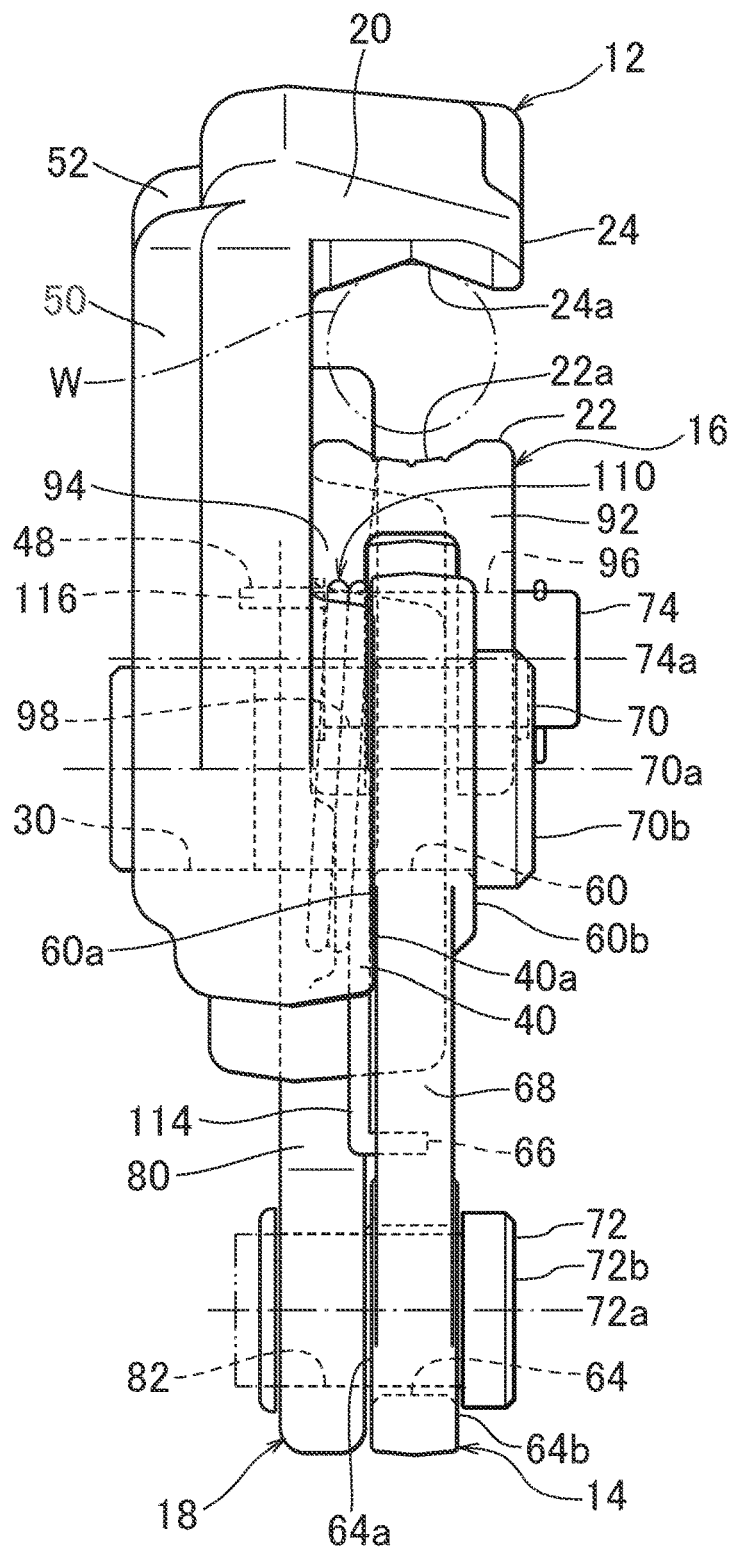
FIG. 5 is an illustration view taken in a direction of arrow in FIG. 3A.

As shown in FIG. 5, the movable gripping body 16 is formed in a U shape in a section, it is provided with one swinging member attaching portion 92 and the other swinging member attaching portion 94 arranged in parallel before and after, and the one swinging member attaching hole 96 is bored in the one swinging member attaching portion 92, while the other swinging member attaching hole 98 is bored in the other swinging member attaching portion 94.

The movable gripping body 16 has an upper face formed with a wire-like body holding portion 22 receiving a lower portion of the wire-like body W. The wire-like body holding portion 22 has a clamping groove 22a on an upper face thereof such the clamping groove 22a is opposed to a clamping groove 24a formed on the lower face of the stationary gripping body 20.

The clamping groove 22a of the wire-like body holding portion 22 is formed so as to be parallel to a reference plane Pyz including a left and right axis which is a direction in which the stationary gripping body 20 and the movable gripping body 16 extend. The reference plane Pyz constitutes approximately vertical face when the wire gripper 10 is hung from the wire-like body W by gripping the wire gripper 10.

The movable gripping body 16 is attached to the swinging member 14 such the one swinging member attaching portion 92 and the other swinging member attaching portion 94 are caused to stride over an upper portion of a rear portion of the swinging member 14, and the one swinging member attaching hole 96, the other swinging member attaching hole 98, and the movable gripping body attaching hole 62 of the swinging member 14 are aligned with one another in parallel.

The movable gripping body 16 is swingably attached to the swinging member 14 by the movable gripping body swinging shaft 74 inserted into the one swinging member attaching portion 96, the other swinging member attaching portion 98 and the movable gripping body attaching hole 62 which are aligned with one another.

The movable gripping body attaching hole 62 of the swinging member 14, and the one swinging member attaching hole 96 and the other swinging member attaching hole 98 of the movable gripping body 16 have the same diameter and they are arranged such that outer peripheral edges of their holes are in parallel.

The one swinging member attaching portion 92 and the other swinging member attaching portion 94 are attached to the swinging member 14 such that faces thereof opposed to each other are vertical faces and the faces are parallel to the top portion 32a of the ridge 32 and the top portion 40a of the ridge 40.

The faces of the one swinging member attaching portion 92 and the other swinging member attaching portion 94 facing each other (respective inner faces) are orthogonal to directions in which the outer peripheral edges of the holes of the one swinging member attaching hole 96 and the other swinging member attaching hole 98 extend and are orthogonal to the axial center 74a of the movable gripping body swinging shaft 74.

The movable gripping body 16 attached to the swinging member 14 is swung about the axial center 74a of the movable gripping body swinging shaft 74.

A swinging range of the movable gripping body 16 can be set to swinging in such a degree that deviation from a state that an upper face of the movable gripping body 16 becomes parallel to the lower face of the wire-like body pressing-down portion 24 of the stationary gripping body 20 due to swinging of the swinging member 14 is corrected, so that the swinging range is restricted.

The movable gripping body 16 is attached to the swinging member 14 such that the clamping groove 22a thereof is positioned just below the clamping groove 24a of the stationary gripping body 20 and the clamping groove 22a of the movable gripping body 16 and the clamping groove 24a of the stationary gripping body 20 face each other.

The swinging member 14 is attached to the near side of the top portion 32a of the ridge 32 and the near side of the top portion 40a of the ridge 40 of the wire gripper main body 12 such that the clamping groove 22a of the movable gripping body 16 attached to the swinging member 14 is positioned just below the clamping groove 24a of the stationary gripping body 20 and the clamping groove 22a of the movable gripping body 16 and the clamping groove 24a of the stationary gripping body 20 face each other.

The connection member 18 is attached to the swinging member 14 such that the connection member main body 80 are parallel to the top portion 32a of the ridge 32 and the top portion 40a of the ridge 40 and extends along a direction where the clamping groove 24a of the stationary gripping body 20 and the clamping groove 22a of the movable gripping body 16 extend below the ridge 32 and the ridge 40 of the wire gripping main body 12. The connection member 18 is swung about the axial center 72a of the connection member swinging shaft 72.

The connection member guiding portion 26 guiding the connection member 18 at a time of pulling the connection member 18 is provided with a first-finger hooking portion 120 extending in the opposite direction to the stationary gripping body 20

The first-finger hooking portion 120 is provided with a length corresponding to the width of a first finger of a human body.

The first-finger hooking portion 120 extends toward the side of pulling the connection member 18 along a direction toward a distal end.

The connection member 18 is rotatably attached with a grip portion 140 on the side of pulling the connection member 18 so as to be opposed to the first-finger hooking portion 120.

The connection member 18 is bored with a grip portion attaching hole 86 for rotatably attaching the grip portion 140 on the side of pulling the connection member 18.

The connection member 18 passes through the stationary gripping body 20 and the movable gripping body 16 and the connection member 18 extends in parallel to the reference plane Pyz including the left and right axis which is a direction where the stationary gripping body 20 and the movable gripping body 16 extend.

The reference plane Pyz is a reference plane including a left and right axis which is a direction in which the wire-like body W gripped between stationary gripping body 20 and the movable gripping body 16 extends.

The grip portion 140 has a shape which can be gripped by a human hand, and it is configured to extend in a direction in which the connection member 18 extends at a time of pulling the connection member 18.

The grip portion 140 is bored with an attaching hole 142 in a region positioned on the side of attachment to the connection member 18, and it is rotatably attached to the attaching hole 142 bored on the side of pulling of the connection member 18 by a grip portion rotation shaft 162.

The grip portion 140 is configured such that it hangs from the connection member 18 toward approximately the same direction as the first-finger hooking portion 120 to be capable of being opposed to the first-finger hooking portion 120.

The ring portion 130 of the grip portion 140 is an approximately oval shape in a front view and it is provided with an upper contour portion 132, a lower contour portion 134, and a side contour portion 136.

The ring portion 130 is formed in an approximately egg shape, a region position on the side of the connection member main body 80 being narrow and a free end region on the opposite side to the side of the connection member main body 80 bulging.

The upper contour portion 132 forming an upper region of the grip portion main body 146 and a lower region of the lower contour portion 134 have a taper shape expanding a space therebetween along a direction from a boundary portion 138 between the attaching portion 158 and the ring portion 130 toward the free end side.

The lower contour portion 134 is configured such that the side contour portion 136 positioned on the free end side falling slightly downward beyond the lower end edge of the attaching portion 158.

The grip portion main body 146 is configured such that principal faces (a face on the front face side and a face on a back face side) intersect principal faces (a face on the front face side and a face on a back face side) of the connection member main body 80 obliquely.

The grip portion 140 is formed in an approximately egg shape provided with a length of a palm of a hand of a human body, and a region thereof on the attaching side to the connection member 18 is narrow and a free end region thereof on the opposite side to the attaching side to the connection member 18 bulges. The grip portion 140 is bored with a pulling hole 144 in which a wire pulling the wire-like body W or the like is inserted at a central portion thereof.

The grip portion 140 is bored with a pulling hole 144 at the central portion of the grip portion main body 146 having an approximately egg shape, and it is provided in a projecting manner with an attaching portion 158 described later in a region on the attaching side of the grip portion main body 146 to the connection member 18.

The above-described grip portion main body 146 is formed with an inclined portion 148 inclined to a principal face around the grip portion attaching hole 86 and a principal face of the attaching portion 158 (a face on the front face side and a face on a back face side), and the inclined portion 148 is constituted as a retracting region retracting the wire-like body W.

The inclined portion 148 is configured to be positioned on the opposite side to the wire-like body W gripped between the stationary gripping body 20 and the movable gripping body 16 at a time of pulling the connection member 18.

The attaching portion 158 of the grip portion 140 extends in a parallel to the reference plane Pyz including a left and right axis which is a direction in which the stationary gripping body 20 and the movable gripping body 16 extend, where the connection member attaching projecting portion 160a and a connection member attaching projecting portion 160b passes through the connection member 18, the stationary gripping body 20 and the movable gripping body 16.

The grip portion 140 is configured such that the grip portion main body 146 on the free end side beyond the connection member attaching projecting portion 160a and the connection member attaching projecting portion 160b, namely, a region around the pulling hole 144 formed with the pulling hole 144, that is, the inclined portion 148 becomes parallel to the inclined reference plane Pxz passing through a region around the pulling hole 144 formed with the pulling hole 144.

In this embodiment, the inclined portion 148 of the grip portion main body 146 is configured such that the sides of the upper contour portion 132 and the side contour portion 136 are positioned on the farther side beyond the far side of the clamping groove 22a of the wire-like body holding portion 22 and the clamping groove 24a of the wire-like body pressing-down portion 24, namely, the depth side where the far side of the wire-like body W is positioned.

The grip portion 140 is formed with a thenar eminence abutting portion 150 where the thenar eminence side of a palm of a hand of a human body abuts on an end edge on the opposite side to the first-finger hooking portion 120, and is formed with a finger abutting portion 152 where a second finger and/or a third finger of a human body abuts on an end edge on the side opposed to the first-finger hooking portion 120, when it is hung from the connection member 18 toward approximately the same direction as the first-finger hooking portion 120.

The grip portion 140 is formed with the thenar eminence abutting portion 150 where the thenar eminence side of a palm of a hand of a human body abuts on an end edge on the opposite side to the first-finger hooking portion 120 when it is hung from the connection member 18 toward approximately the same direction as the first-finger hooking portion 120.

The grip portion 140 is formed with a thumb abutting portion 154 on the region on the connection member attaching side subsequent to the thenar eminence abutting portion 150.

The grip portion 140 is formed with a finger abutting portion 152 where a second finger and/or a third finger of a human body abuts on an end edge constituting the side opposed to the first-finger hooking portion 120, when it is hung from the connection member 18 toward approximately the same direction as the first-finger hooking portion 120, and is formed with a small-finger abutting portion 156 in a region on the opposite side to the connection member attaching side subsequent to the thumb abutting portion 154.

The thenar eminence abutting portion 150 of the grip portion 140 is formed in an arc shape bulging toward the near side in the near side region positioned on the near side when a person grips the grip portion 140 in a state hung from the free end side of the connection member 18 (the side of pulling the connection member 18) with a hand.

The finger abutting portion 152 of the grip portion 140 is formed in a straight shape or a curved shape so as to be positioned on the far side when a person grips the grip portion 140 in a state hung from the free end side of the connection member 18 (the side of pulling the connection member 18) with a hand.

The small-finger abutting portion 156 of the grip portion 140 is formed so as to be positioned on the lower side when a person grips the grip portion 140 in a state hung from the free end side of the connection member 18 (the side of pulling the connection member 18) with a hand.

The grip portion 140 is formed with an attaching portion 158 for attaching the grip portion 140 to the connection member 18 at one end thereof in a longitudinal direction.

The attaching portion 158 is formed in a forked shape in a region thereof on the attaching side to the connection member 18, and it is provided in a recessed manner with a connection member inserting recessed portion 168 at a central portion thereof.

The connection member inserting recessed portion 168 is a U-shaped recess in a section in which the connection member 18 is inserted in a fitting manner.

A connection member attaching projecting portion 160a and a connection member attaching projecting portion 160b are formed on both sides of the connection member inserting recessed portion 168. The connection member attaching projecting portion 160a and the connection member attaching projecting portion 160b are opposed to each other, and the connection member 18 is inserted in the connection member inserting recessed portion 168 therebetween in a fitting manner.

A side face of the connection member inserting recessed portion 168 of the connection member attaching projecting portion 160a and a side face of the connection member inserting recessed portion 168 of the connection member attaching projecting portion 160b are formed in parallel to the reference plane Pyz including the left and right axis which is a direction in which the stationary gripping body 20 and the movable gripping body 16 extend.

The connection member attaching projecting portion 160a and the connection member attaching projecting portion 160b are bored with attaching holes 142, respectively. The attaching hole 142 of the connection member attaching projecting portion 160a and the attaching hole 142 of the connection member attaching projecting portion 160b are made parallel to the grip portion attaching hole 86 of the connection member 18 attached therebetween and the grip portion rotation shaft 162 is inserted therein. The grip portion 140 is rotated about the grip portion rotation shaft 162 on the free end side of the connection member 18 (the pulling side).

The connection member inserting recessed portion 168 is configured to abut on the lower end edge of the connection member 18 to stop at an optimal position for gripping the connection member 18 at a time of gripping the grip portion 140 in a hung state.

The stopped connection member 18 is opposed to the first-finger hooking portion 120.

The grip portion rotation shaft 162 extends from a far side face of the connection member attaching projecting portion 160b toward the far side face to be formed with the finger hooking portion 164.

The finger hooking portion 164 is configured, for example, such that a first finger of a hand of a human body hooks the first-finger hooking portion 120 and the thumb of the same hand hooks the finger hooking portion 164. The finger hooking portion 164 is configured so as to reduce a space between a first finger hooked to the first-finger hooking portion 120 and the a thumb hooked to the finger hooking portion 164 to perform movement to the opposite side to the side of pulling the connection member 18 in a small amount.

Figure 11A:
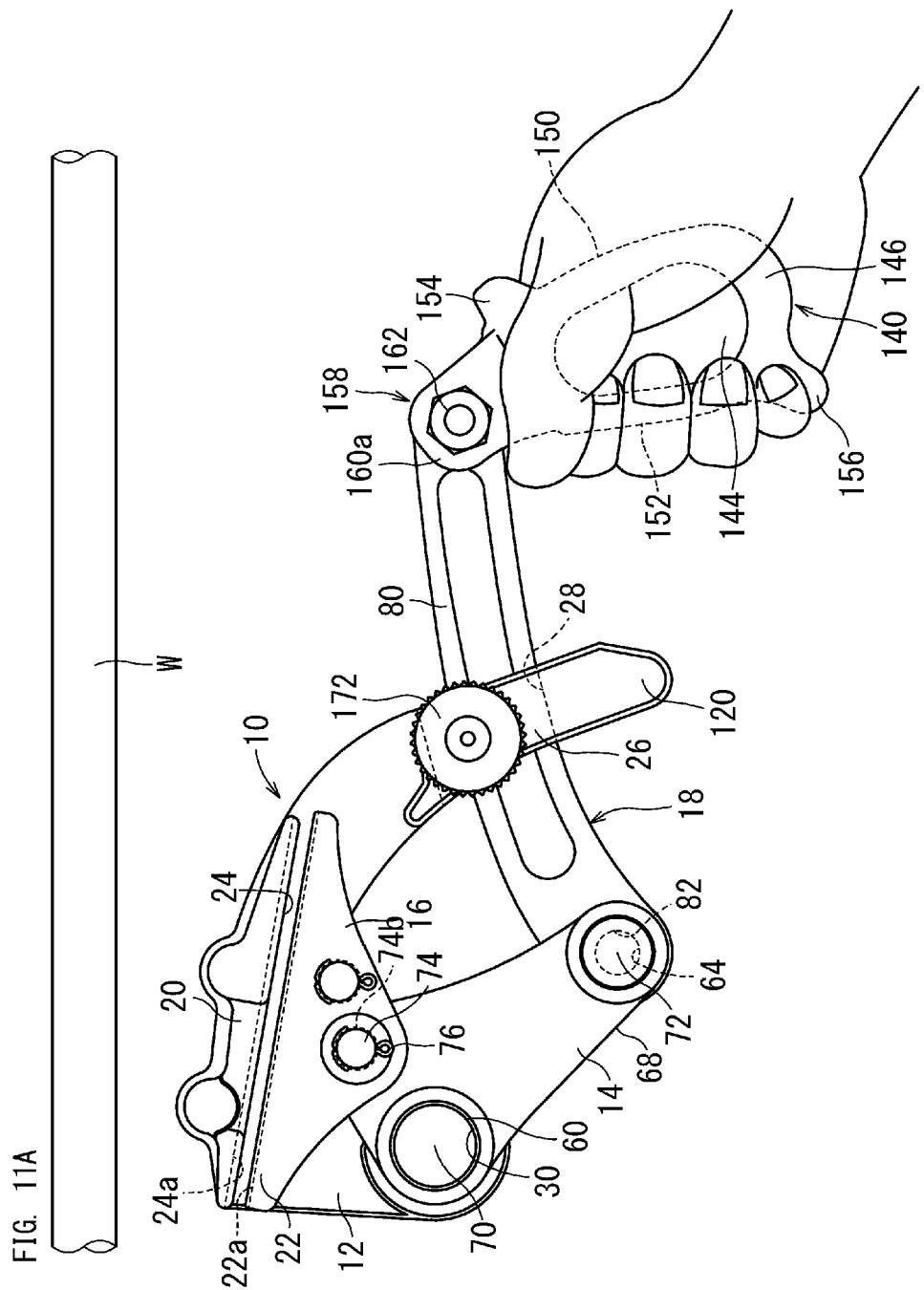
FIG. 11A is a front illustration view showing a use stage of a wire gripper which is an embodiment.
Figure 11B:
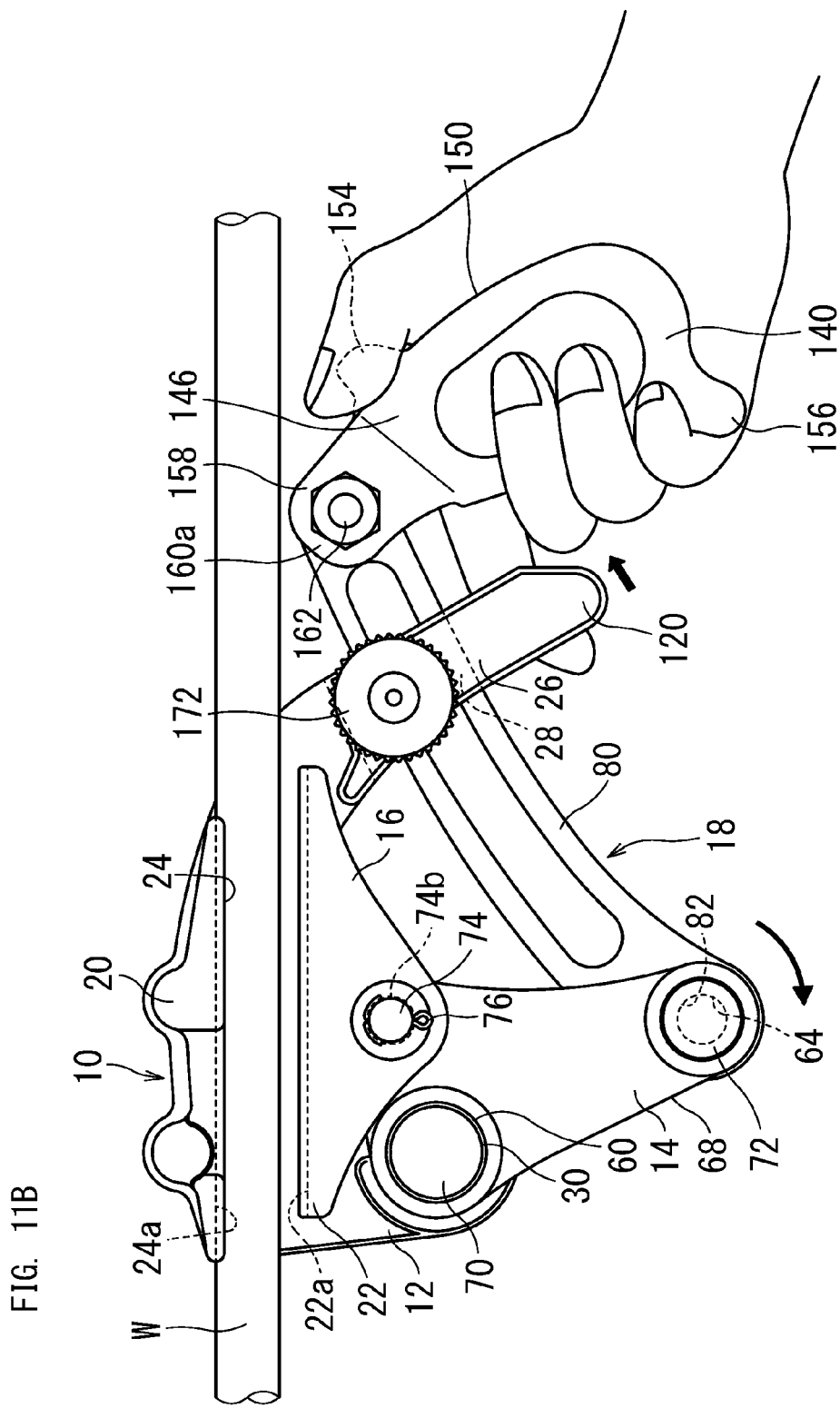
FIG. 11B is a front illustration view showing a use stage of a wire gripper which is an embodiment.
Figure 11C:
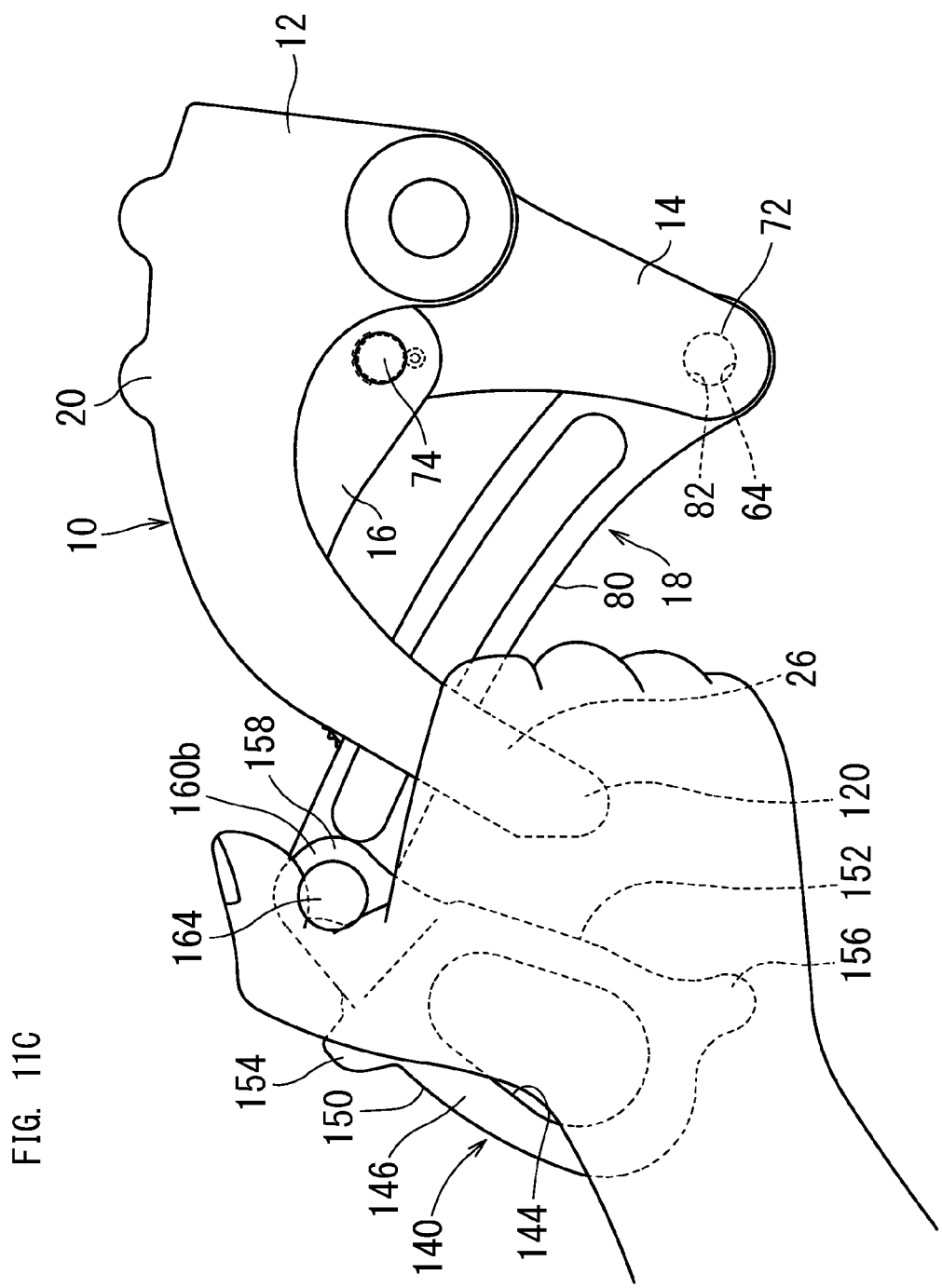
FIG. 11C is a back illustration view showing a use stage of a wire gripper which is an embodiment.

In particular, as shown in FIG. 11C, the finger hooking portion 164 is used when the space between the stationary gripping portion 20 and the movable gripping portion 16 is changed in a small amount after the wire gripper 10 is hooked to wire-like body W.

The pulling hole 144 is a long hole extending in the longitudinal direction of the attaching hole 142 from the vicinity of the side of the connection member inserting recessed portion 168 of the attaching hole 142.

The pulling hole 144 is formed in an arc shape such that the hole edge positioned behind the pulling hole 144, namely on the pulling side makes it easy to hook a hook or a belt of the wire tensioner.

The pulling hole 144 is configured such that the hole edge positioned behind the pulling hole 144, namely on the pulling side, that is, the hole edge at the position of hooking the hook or the belt of the wire tensioner is positioned in the vicinity of the wire-like body W.

The connection member guiding portion 26 is bored with a guide hole 28 which is a through-hole in which the connection member 18 is inserted, and it is provided with a connection member suppressing mechanism 170 for suppressing returning of the connection member 18 pulled toward the connection member 18.

The connection member suppressing mechanism 170 is provided on the connection member 18 and/or the connection member guiding portion 26, and it is configured so as to suppress movement of the connection member 18 such that it is fastened/caught/kept back so as not to change the space between the wire-like body pressing-down portion 24 of the stationary gripping body 20 and the wire-like body holding portion 22 of the movable gripping body 16.

The connection member suppressing mechanism 170 has a pressing body 172 provided to freely advance and retract toward and to the principal face side of the connection member 18, and a slope face 190 gradually pulling out toward the pressing body 172 along such a direction that the principal face of the connection member 18 pressed by the pressing body 172 moves the side of the connection member 18 pulled.

The connection member suppressing mechanism 170 is provided with the pressing body 172 attached to the connection member guiding portion 26 so as to advance and retract freely.

The connection member guiding portion 26 is formed with a female screw hole 180.

The pressing body 172 can be moved to advance and retract through screwing with a female screw hole 180 by rotationally operating the handle 174 fixed on the rear side thereof.

The pressing body 172 is formed with a male screw portion 176 screwed to the female screw hole 180 of the connection member guiding portion 26.

Figure 6:
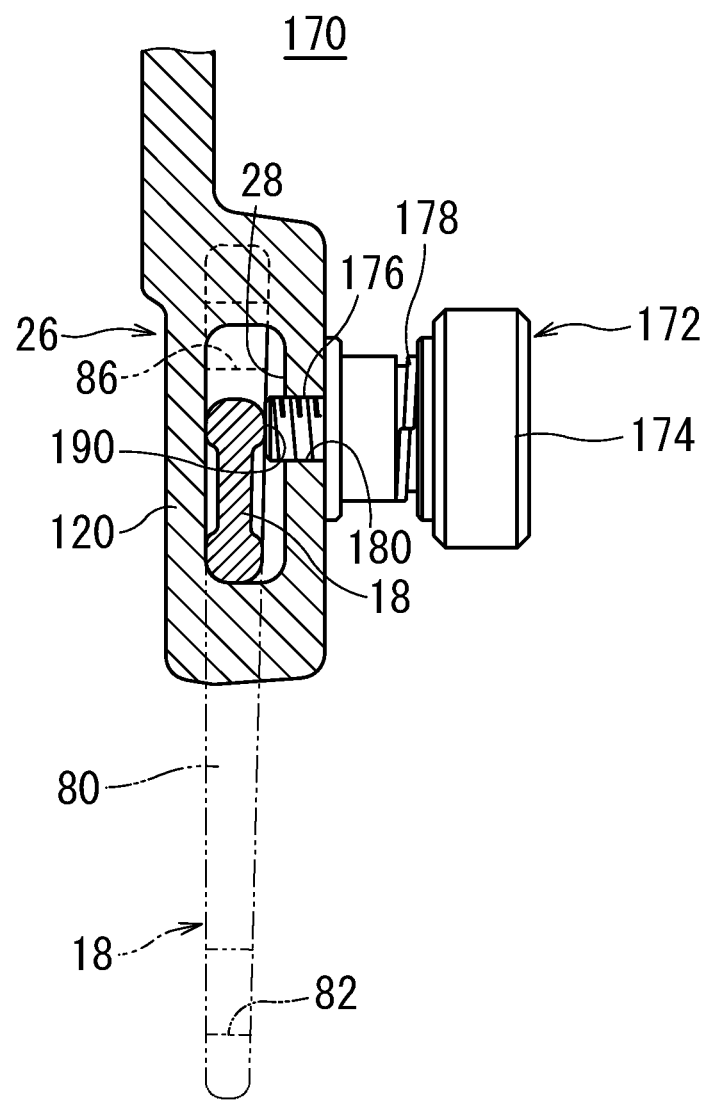
FIG. 6 is a side illustration view of a connection member and a connection member guiding portion of a wire gripper which is an embodiment according to the present invention.
Figure 7A:
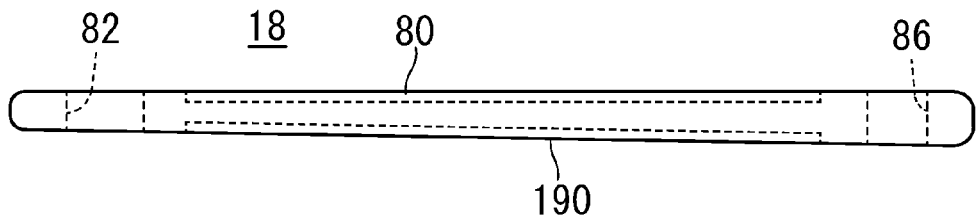
FIG. 7A is a plan illustration view showing a connection member.
Figure 7B:
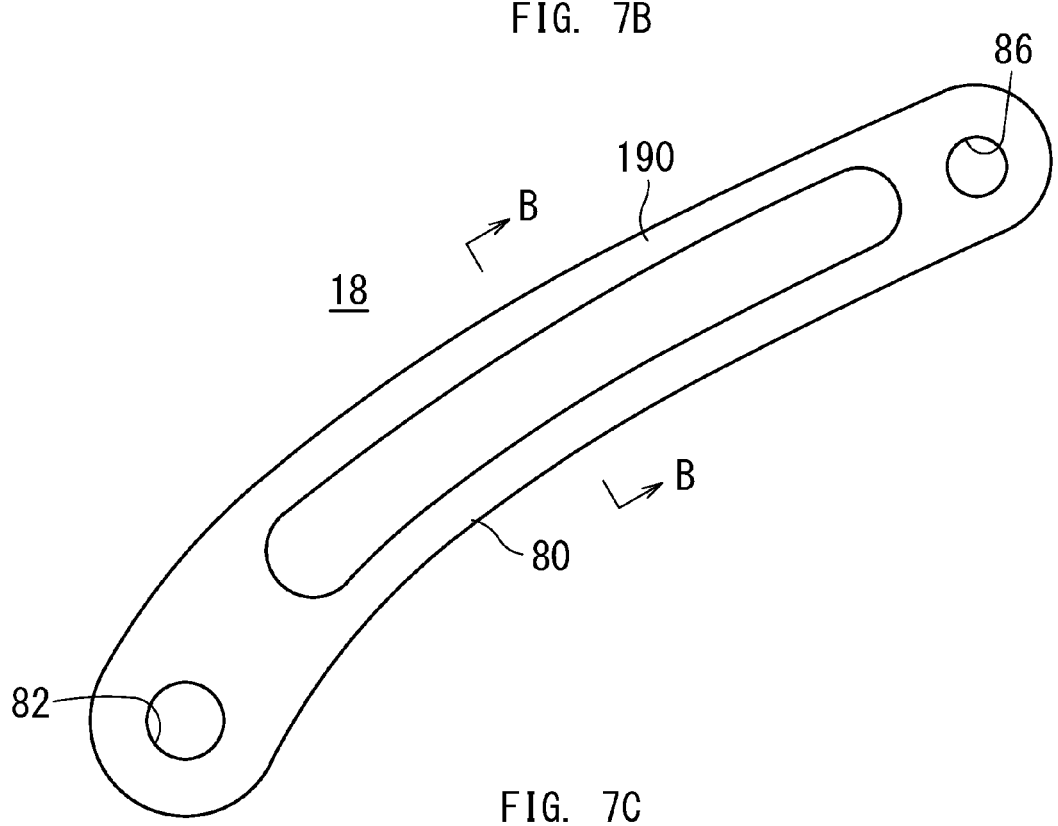
FIG. 7B is a front illustration view.
Figure 7C:
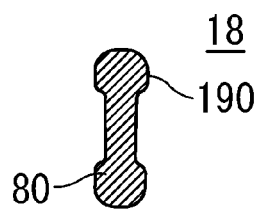
FIG. 7C is a sectional illustration view showing a connection member taken along line B-B.
Figure 7D:
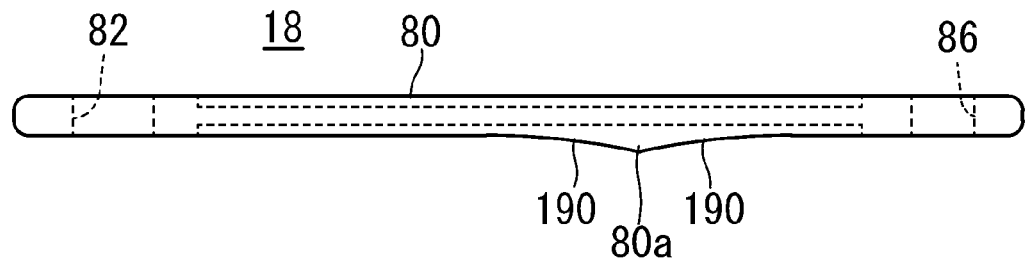
FIG. 7D is a plain illustration view showing the connection member and a connection member suppressing mechanism
Figure 7E:
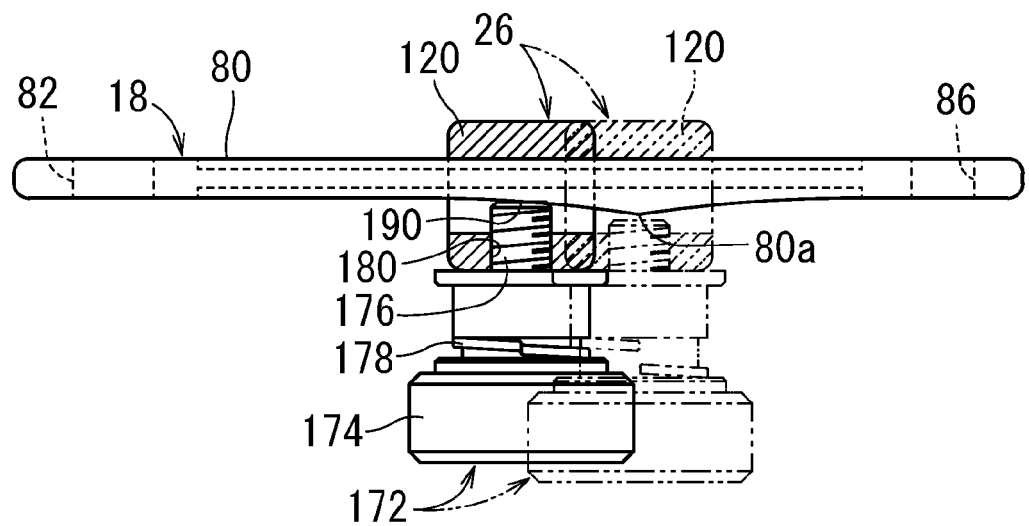
FIG. 7E is a plan illustration views of the connection member and the connection member suppressing mechanism partially sectioned.
Figure 7F:
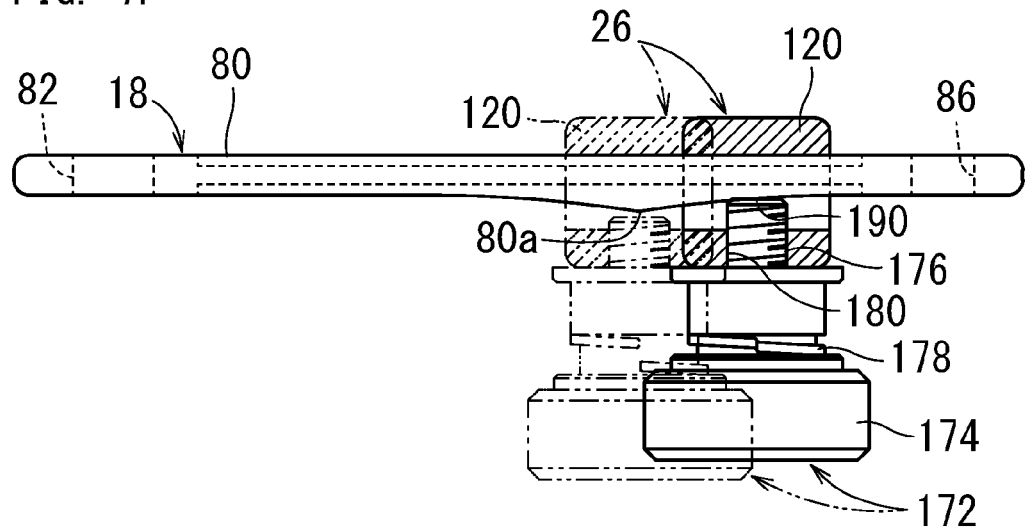
FIG. 7F is a plan illustration views of the connection member and the connection member suppressing mechanism partially sectioned.
Figure 8A:
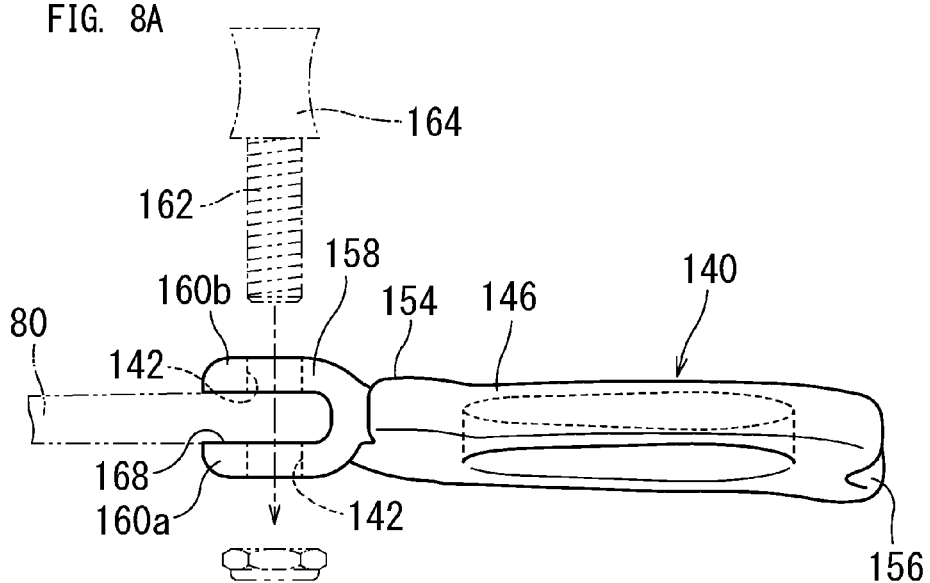
FIG. 8A is a plain illustration view of a grip portion.
Figure 8B:
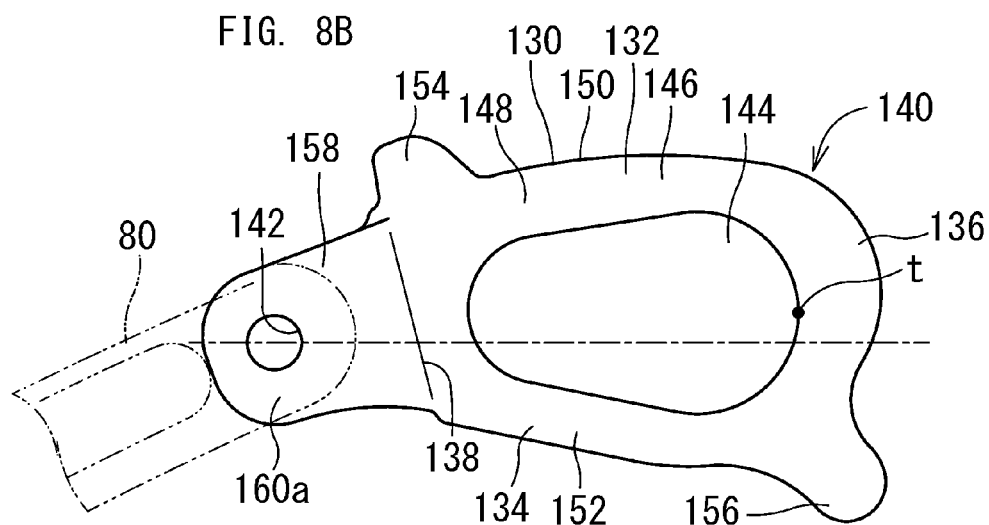
FIG. 8B is a front illustration view of a grip portion.
Figure 8C:
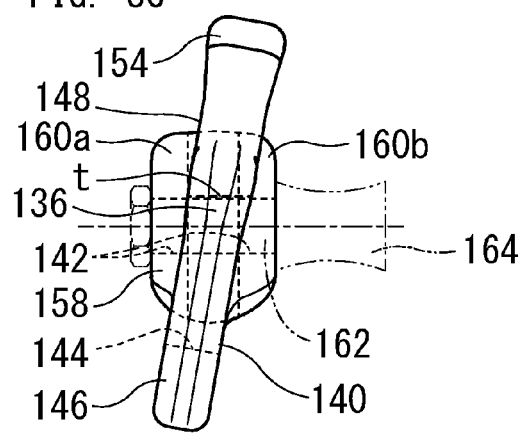
FIG. 8C is a side illustration view of a grip portion.
Figure 10:
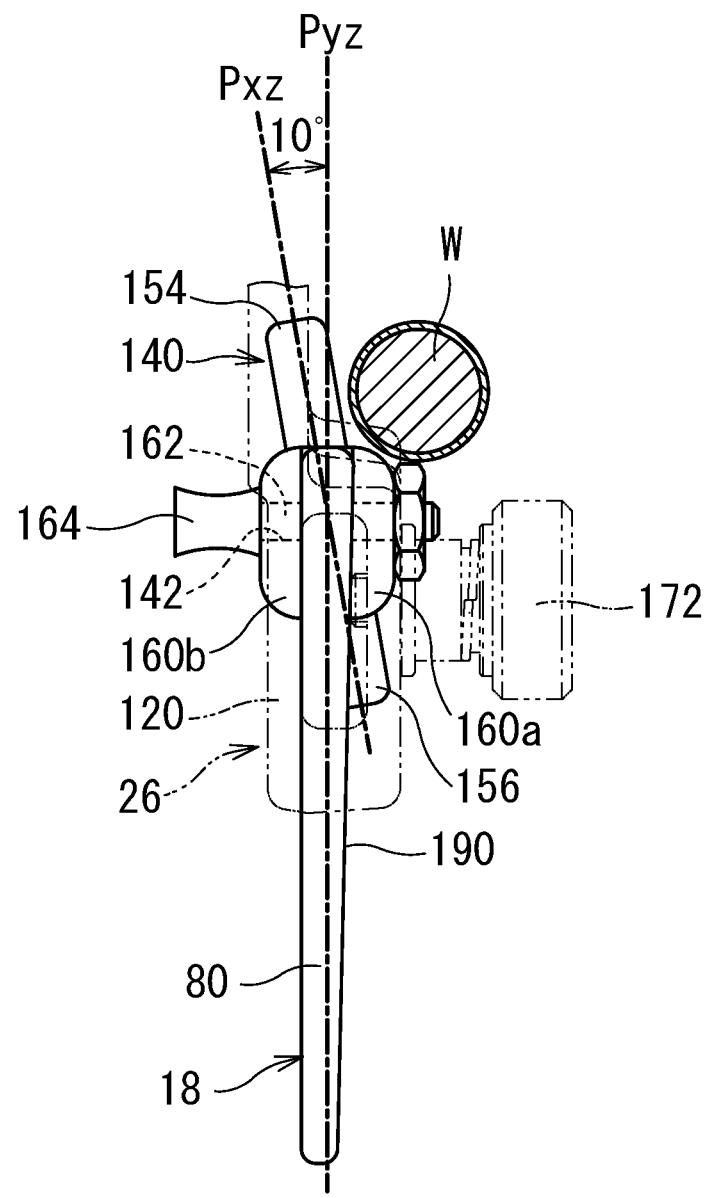
FIG. 10 is a side illustration view of a wire gripper.

As shown in FIG. 6, since the pressing body 172 is biased to the side of the handle 174 by a spring washer 178, the pressing body 172 moves to advance up to a position of abutting on the near side face of the connection member 18 to be put in a fixed state.

When the pressing body 172 moves to advance toward the connection member 18 to cause the pressing body 172 to abut on the near side face of the connection member 18 by rotationally operating the handle 174 in a state where the wire-like body W has been gripped between the wire-like body pressing-down portion 24 of the stationary gripping body 20 and the wire-like body holding portion 22 of the movable gripping body 16, the spring washer 178 is put in a state of compressing the handle 174, as shown in FIG. 6.

The slope face 190 of the connection member 18 constituting the connection member suppressing mechanism 170 is formed on the near side face of the connection member 18.

The connection member 18 has a longitudinal direction extending from the side of pulling back the connection member 18 toward the pulling side, and it is a column-shaped body tapered in a plan view where a width between the face of the near side and the face of the far side becomes longer according to arrival from the pulling-back side to the pulling side.

Therefore, the connection member 18 whose near side face is pressed by the pressing body 172 stops at a predetermined position without moving to the pulling-back side. Therefore, the space between the stationary gripping body 20 and the movable gripping body 16 does not change so that the wire gripper 10 can hold the wire-like body W.

The connection member 18 pressed by the pressing body 172 is configured such that the face (namely, the face of the far side) of the opposite side to the principal face pressed by the pressing body 172 (namely, the face projecting toward the pressing body 172 on the near side) is pressed to the hole wall face of the guide hole 28 which is the through-hole in which the connection member 18 has been inserted.

The connection member suppressing mechanism 170 may be configured such that instead of forming the slope face 190 of the connection member 18 in the taper shape, a gently sloped projecting portion 80a inclined in the longitudinal direction of the connection member 18 is provided in an intermediate region of the slope face 190, so that the connection member 18 is not moved in the pulling-back direction.

The projecting portion 80a constituting the connection member suppressing mechanism 170 is formed on one face of the connection member 18, namely, a face facing the male screw portion 176 of the pressing body 172.

Therefore, when moving the connection member 18, the pressing body 172 is loosened to advance the male screw portion 176 of the pressing body 172 to the face having the projecting portion 80a of the connection member 18 to be locked to the male screw portion 176 to the surface of the connection member main body 80 other than the projecting portion 80a (of the connection member 18) to be stopped by fastening of the pressing body 172 when the projecting portion 80a of the connection member suppressing mechanism 170 is not engaged with the male screw portion 176 but the connection member 18 is made immovable in place of the connection member guiding portion 26.

The connection member suppressing mechanism 170 may be provided with a fitting mechanism fitted between the hole wall face of the guide hole 28 in which the connection member 18 is inserted and the connection member 18 which has been inserted into the guide hole 28.

The fitting mechanism is composed of a block body fitted between an upper side face or a lower side face of the connection member 18 intersecting a face on the near side and a face on the far side and the hole wall face (the lower side or the upper side) of the guide hole 28.

The grip portion main body 146 of the grip portion 140 is configured such that it is inclined to the principal face of the attaching portion 158 in the vicinity of the attaching portion 158 attached to the connection member 18 so that the thenar eminence abutting portion 150 constituting an upper side region which is a region near the wire-like body W is positioned on the opposite side of the wire-like body W gripped between the stationary gripping body 20 and the movable gripping body 16 at a time of pulling the connection member 18. When the grip portion main body 146 is inclined to the principal face of the attaching portion 158 by about 10°, the grip portion 140 touches a palm of a hand easily, which makes it easy to grip the grip portion 140.

The attaching portion 158 of the grip portion 140 extends in parallel to the reference plane Pyz including the left and right axis which is a direction where the stationary gripping body 20 and the movable gripping body 16, where the connection member attaching projecting portion 160a and the connection member attaching projecting portion 160b pass through the connection member 18, the stationary gripping body 20 and the movable gripping body 16.

The grip portion 140 is configured such that an inclined reference plane Pxz where the grip portion main body 146 on the free end side beyond the connection member attaching projecting portion 160a and the connection member attaching projecting portion 160b, namely, a region around the pulling hole 144 formed with the pulling hole 144 passes through the region around the pulling hole 144 formed with the pulling hole 144 and the reference plane Pyz intersect each other obliquely.

The inclined reference plane Pxz is inclined to be positioned on the far side of the wire-like body W whose upper side is gripped between the stationary gripping body 20 and the movable gripping body 16 when the grip portion 140 is stretched in the direction in which the connection member 18 extends along the reference plane.

In this embodiment, the thenar eminence abutting portion 150 of the grip portion 140 is configured to be positioned to the farther side beyond the depth side where the far side of the clamping groove 22a of the wire-like body holding portion 22 and the wire-like body pressing-down portion 24, namely, the far side of the wire-like body W are positioned.

The grip portion 140 is configured such that the grip portion 140 does not interfere with the wire-like body W by approximating the center of the pulling hole 144 to the center of the wire-like body W.

The grip portion 140 can pull the wire-like body W without inclination of the wire gripper 10 and bending the wire-like body W, since the hook or the belt of the wire tensioner attached to the pulling hole 144 is pulled at a position where the pulling side of the connection member main body 80 and the attaching portion 158 are closed to the center of the wire-like body W when the hook or the belt is pulled.

The grip portion 140 and the connection member 18 are formed such that when the hook or the belt of the wire tensioner is hooked to the pulling hole 144 of the grip portion 140 and it is pulled, a starting point t on which a pulling force acts is located at a position close to the wire-like body W.

Further, the grip portion 140 and the connection member 18 are formed such that when the hook or the belt of the wire tensioner is hooked and it is pulled, the starting point t on which the pulling force of the attaching hole 142 of the grip portion 140 acts is located at a position close to the wire-like body W.

Formation is made such that the starting point t on which the pulling force of the attaching hole 142 of the grip portion 140 acts is located at a height close to the height of the wire-like body holding portion 22 of the movable gripping body 16.

The starting point t on which the pulling force acts is located at the reference plane Pyz including the left and right axis which is a direction in which the stationary gripping body 20 and the movable gripping body 16 extend and it is located in a direction in which the connection member main body 80 extends.

With such a configuration, when the hook or the belt of the wire tensioner is hooked and it is pulled by the wire tensioner, pulling can be performed approximately in parallel to the direction in which the wire-like body W extends, so that the pulling is performed without inclining the wire gripper 10 and bending or rotating the wire-like body W.

This is approximately similar even if the size of the wire-like body W is changed.

The positions of the grip portion attaching hole 86 and the grip portion rotation shaft 162 are located slightly below a lower edge of the wire-like body W clamped between the wire-like body pressing-down portion 24 of the stationary gripping body 20 and the wire-like body holding portion 22 of the movable gripping body 16 which are held horizontally to be held approximately horizontally, as viewed from the front. Further, the starting point t on which the pulling force acts according to operation of the wire tensioner of the hook or the like in the pulling hole 144 is located slightly below a lower edge of the wire-like body W clamped between the wire-like body pressing-down portion 24 of the stationary gripping body 20 and the wire-like body holding portion 22 of the movable gripping body 16 which are held horizontally to be held approximately horizontally, as viewed from the front.

The grip portion main body 146 is inclined such that the upper side regarding the boundary between the grip portion main body 146 and the attaching portion 158, namely the side close to the wire-like body W is located close to the far side (the depth side opposed to the side where the wire-like body W is inserted) of the wire-like body holding portion 22 of the movable gripping body 16 and the wire-like body pressing-down portion 24 of the stationary gripping body 20 and the lower side regarding the boundary between the grip portion main body 146 and the attaching portion 158, namely the far side from the wire-like body W is located close to the near side (the side where the wire-like body W is inserted) of the wire-like body holding portion 22 of the movable gripping body 16 and the wire-like body pressing-down portion 24 of the stationary gripping body 20.

The wire gripper main body 12 including the stationary gripping body 20 is provided with a ridge 32 around a hole edge of the supporting shaft hole 30 so as to project along the hole edge in order to protect the supporting shaft 70 pivoting the swinging member 14.

The ridge 32 is a circular rib in a front view and continuously provided from a lower portion of the supporting shaft hole 30 to a rear side thereof through a front side and an upper portion thereof.

The ridge 32 projects from the wire gripper main body 12 in a direction where an outer peripheral edge of the hole of the shaft-supporting hole 30 extends (a direction where an axial center 70*a* of the supporting shaft 70 extends).

The ridge 32 has a top portion 32*a* which is planar and spreads in a vertical direction which is a direction intersecting a direction where a hole peripheral edge of the supporting shaft hole 30 extends. The ridge 32 has an approximately trapezoidal shape in a section where the top portion 32*a* is provided with a flat face parallel to a near-side face of the wire gripper main body 12 and the clamping groove 24*a* of the wire-like body pressing-down portion 24 and a peripheral edge of the top portion 32*a* extends in a direction of intersecting the near-side face of the wire gripper main body 12. The ridge 32 is configured such that a height thereof has a length approximately equal to a width of the wire gripper main body 12, and it has approximately the same sectional shape and approximately the same height over a whole circumference thereof.

The ridge 32 is formed in a taper shape where the width thereof gradually becomes narrower toward an upper end (the top portion 32*a*), and a width of a lower end portion thereof is approximately equal to the width of the wire gripper main body 12.

The ridge 32 constitutes a seat on which the swinging member 14 is placed.

The ridge 32 is formed integrally with the wire gripper main body 12 from metal.

Portions around the stationary gripping body attaching hole 60, the movable gripping body attaching hole 62 and the connection member attaching hole 64 bulge on both the near-side face and the far-side face of the swinging member 14 so as to be higher than the other portion of the swinging member 14, and top portions of the bulging portions are vertical flat faces orthogonal to a direction where the peripheral edges of the holes extent. That is, a top portion 60*a* of the bulging portion around the far-side hole of the stationary gripping body attaching hole 60 and a top portion 60*b* of the bulging portion around the near-side hole of the stationary gripping body attaching hole 60, a top portion 62*a* of the bulging portion around the far-side hole of the movable gripping body attaching hole 62 and a top portion 62*b* of the bulging portion around the near-side hole of the movable gripping body attaching hole 62, and a top portion 64*a* of the bulging portion around the far-side hole of the connection member attaching hole 64 and a top portion 64*b* of the bulging portion around the near-side hole of the connection member attaching hole 64 are formed in parallel and they are orthogonal to a direction where the hole edges (outer peripheral edges of the holes) of the stationary gripping body attaching hole 60, the movable gripping body attaching hole 62 and the connection member attaching hole 64 extend.

A sliding contact face of the top portion 60*a* of the bulging portion around the far-side hole formed around the near side of the stationary gripping body attaching hole 60 (a sliding face coming in sliding contact with the top portion 32*a* of the ridge 32 and the top portion 40*a* of the ridge 40) is formed on a vertical face so as to be orthogonal to the rotation (an axial center 70*a* of the supporting shaft 70) of the swinging member 14 and be parallel to the clamping groove 24*a* of the stationary gripping body 20 and the clamping groove 22*a* of the movable gripping body 16.

Sliding contact faces of the top portions 62*a* of the bulging portions around the far side hole and the top portion 62*b* of the bulging portion around the near side hole formed around the far-side and the near-side of the movable gripping body attaching hole 62 (sliding contact faces coming in contact with the attaching faces of the movable gripping body 16) are formed on vertical faces so as to be orthogonal to the rotation axis of the movable gripping body 16 (an axial center 74*a* of the movable gripping body swinging shaft 74) and be parallel to the clamping groove 24*a* of the stationary gripping body 12 and the clamping groove 22*a* of the movable gripping body 16.

A sliding contact face of the top portion 64*a* of the bulging portion around the far-side hole formed around the far-side of the connection member attaching hole 64 (a sliding contact face coming in sliding contact with the attaching face of the connection member 18) is formed on a vertical face so as to be orthogonal to the rotation axis of the connection member 18 (an axial center 72*a* of the connection member swinging shaft 72) and be parallel to the clamping groove 24*a* of the stationary gripping body 20 and the clamping groove 22*a* of the movable gripping body 16.

The swinging member 14 is rotatably attached to the stationary gripping body 20 at one end portion thereof by the supporting shaft 70 utilizing the supporting shaft 30*a* s a pivoting shaft by joining the swinging member 14 to the ridge 32 provided on the stationary gripping body 20 and aligning the supporting shaft hole 30 and the stationary gripping body attaching hole 60 are aligned with each other.

The swinging member 14 swings in a direction parallel to a direction in which the wire-like body pressing-down portion 24 of the stationary gripping body 20 extends.

The swinging member 14 is attached rotatably by the connection member swinging shaft 72*by* joining the other end thereof with one end of the connection member 18 and aligning the swinging member attaching hole 82 of the connection member 18 and the connection member attaching hole 64 of the swinging member 14 with each other in parallel.

Further, the swinging member 14 is rotatably attached with the movable gripping body 16 by the movable gripping body swinging shaft 74 at the movable gripping body attaching hole 62 provided at a position adjacent to the stationary gripping body attaching hole 60.

The supporting shaft 70 is formed in a circular column shape having an axial center 70*a* extending in a length direction, and it is provided with a flange portion 70*b* projecting in a direction intersecting the axial center 70*a* at a near side thereof. The supporting shaft 70 is attached to the wire gripper main body 12 and the swinging member 14 by inserting the supporting shaft 70 into the stationary gripping body attaching hole 60 of the swinging member 14 in a fitting manner, joining the flange portion 70*b* to a periphery of the stationary gripping body attaching hole 60 and performing screwing with the supporting shaft hole 30 of the wire gripper main body 12. The axial center 70*a* of the supporting shaft 70 constitutes a center of rotation of the swinging member 14. The supporting shaft 70 may be caulked on the far side of the supporting shaft hole 30.

The connection member swinging shaft 72 is formed in a circular column shape having an axial center 72*a* extending in a length direction, and it is provided with a flange portion 72*b* projecting in a direction intersecting the axial center 72*a* at a near side thereof. The connection member swinging shaft 72 is attached to the swinging member 14 and the connection member 18 by fitting the connection member swinging shaft 72 to the connection member attaching hole 64 of the swinging member 14 from the near side, fitting the connection member swinging shaft 72 to the swinging member attaching hole 82 of the connection member 18 from the near side and caulking the same on the far side of the swinging member attaching hole 82. The axial center 72*a* of the connection member swinging shaft 72 constitutes the center of rotation of the connection member 18.

The movable gripping body swinging shaft 74 is formed in a circular column shape having an axial center 74*a* extending in a length direction, and it is provided with a flange portion 74*b* projecting in a direction intersecting the axial center 74*a* at a far side thereof. The movable gripping body swinging shaft 74 is fixed in a site of projecting to the near side of one swinging member attaching hole 96 of the near side of the movable gripping body 16 by a cotter pin 76 by inserting the movable gripping body swinging shaft 74 into the movable gripping body attaching hole 62 of the swinging member 14 from the other swinging member attaching hole 98 on the far side of the movable gripping body 16 in a fitting manner, inserting the movable gripping body swinging shaft 74 into one swinging member attaching hole 96 in a fitting manner, and joining the flange portion 74*b* to a periphery of the other swinging member attaching hole 98. The axial center 74*a* of the movable gripping body swinging shaft 74 constitutes the center of rotation of the movable gripping body 16.

An outer periphery on the far side of the other swinging member attaching hole 98 has a step formed in a circular ring shape in a circumferential direction. A surface on the far side of the flange portion 74*b* of the movable gripping body swinging shaft 74 is configured so as to be continuous to the far side face of the other swinging member attaching portion 94 regarding a plane when the flange portion 74*b* of the movable gripping body swinging shaft 74 is inserted into the circular ring-shape step difference portion 98*a*.

The supporting shaft hole 30 and the stationary gripping body attaching hole 60 of the swinging member 14 have the same diameter, and they are arranged in parallel such that outer peripheral edges of their holes are parallel to each other.

A direction in which the peripheral edge of the supporting shaft hole 30 extends and a direction in which the peripheral edges of the stationary gripping body attaching hole 60, the movable gripping body attaching hole 62 and the connection member attaching hole 64 extend are parallel to each other, and the direction in which the peripheral edge of the supporting shaft hole 30 extends, the direction in which the peripheral edges of the stationary gripping body attaching hole 60, the movable gripping body attaching hole 62 and the connection member attaching hole 64 extend, the axial center 70*a* of the supporting shaft 70, the axial center 72*a* of the connection member swinging shaft 72, and the axial center 74*a* of the movable gripping body swinging shaft 74 are parallel to each other.

The ridge 32 and the ridge 40 of the wire gripper main body 12 are formed to have constant heights such that their near side faces (sliding faces of the top portion 32*a* and the top portions 40*a* opposed to the sliding face of the top portion 60*a* of the budging portion around the hole of the stationary gripping body attaching hole 60 of the swinging member 14) are parallel to a direction in which the clamping groove 24*a* of the stationary gripping body 20 extends and are orthogonal to the axial center 70*a* of the supporting shaft 70.

The sliding faces of the top portion 32*a* of the ridge 32 and the top portion 40*a* of the ridge 40 are parallel faces opposed to the top portions of the bulging portions around the holes of the stationary gripping body attaching hole 60, the movable gripping body attaching hole 62 and the connection member attaching holes 64 (the top portion 60*a* of the bulging portion around the hole on the far side, the top portion 62*a* of the bulging portion around the hole on the far side, the top portion 64*a* of the bulging portion around the hole on the far side, the top portion 60*b* of the bulging portion around the hole on the near side, the top portion 62*b* of the bulging portion around the hole on the near side, and the top portion 64*b* of the bulging portion around the hole on the near side). Further, the top portion 32*a* of the ridge 32 and the top portion 40*a* of the ridge 40, and the bulging portion around the stationary gripping body attaching hole 60 (the top portion 60*a* of the bulging portion around the hole on the far side) surface-contact with one another so as to rotate the swinging member 14 around the axial center 70*a* of the supporting shaft 70.

Further, a vertical plane P1 contacting with the top portion 32*a* of the ridge 32 and the top portion 40*a* of the ridge 40 is configured so as to pass through inside of the guide hole 28 of the connection member guiding portion 26.

A vertical plane P2 passing through the near side face around the stationary gripping body attaching hole 60 and the near side face (the sliding face of the top portion 62*b* of the budging portion around the hole on the near side) around the movable gripping body attaching hole 62 of the swinging member 14 and a vertical plane P3 passing through the fare side face around the stationary gripping body attaching hole 60 and the far side face (the sliding face of the top portion 62a of the budging portion around the hole on the far side) around the movable gripping body attaching hole 62 of the swinging member 14 are vertical to the axial center 70a of the supporting shaft 70, the axial center 72a of the connection member swinging shaft 72 and the axial center 74a of the movable gripping body swinging shaft 74 and they are parallel to the clamping groove 24a of the stationary gripping body 20. Further, the vertical plane P3 passing through the far side face around the stationary gripping body attaching hole 60 of the swinging member 14 and the far side face (the sliding face of the top portion 64a of the bulging portion around the hole on the far side) attached with the connection member 18 of the movable gripping body attaching hole 62 is vertical to the axial center 70a of the supporting shaft 70, the axial center 72a of the connection member swinging shaft 72 and the axial center 74a of the movable gripping body swinging shaft 74 and it is configured so as to pass through inside of the guide hole 28 of the connection member guiding portion 26.

The plane P1 contacting with the top portion 32a of the ridge 32 and the top portion 40a of the ridge 40, the plane P2 passing through the near side face (the sliding face of the top portion 62b of the bulging portion around the hole on the near side) around the movable gripping body attaching hole 62, and the plane P3 passing through the far side face (the sliding face of the top portion 60a of the bulging portion around the hole on the far side) around the stationary gripping body attaching hole 60 and the far side face (the sliding face of the top portion 62a of the bulging portion around the hole on the far side) around the movable gripping body attaching hole 62 are parallel to each other and they constitute a vertical face to the axial center 70a of the supporting shaft 70, the axial center 72a of the connection member swinging shaft 72 and the axial center 74a of the movable gripping body swinging shaft 74.

The wire gripper main body 12 may be provided with a plurality of linear ridges on a face opposed to a face formed with the ridge 32 and ridge 40 in the vicinity of the supporting shaft hole 30 in which the supporting shaft 70 for attaching the swinging member 14 is inserted. For example, a first linear ridge 50 and a second linear ridge 52 extending from a lower portion of a vertically extending portion of the wire gripper main body 12 toward the wire-like body pressing-down portion 24 may be provided on the vertically extending portion with a proper spacing.

The first linear ridge 50 and the second linear ridge 52 are formed in a straight line shape and are formed in a flat shape on top portions thereof, are formed in approximately trapezoidal shape in a section parallel to the near side face of the wire gripper main body 12, have approximately the same length as the width of the wire gripper main body 12, and have approximately the same sectional shape, approximately the same length and approximately the same height entirely.

The first linear ridge 50 and the second linear ridge 52 are provided with a proper spacing from the hole edge of the supporting shaft hole 30 and are provided in parallel. A spacing between the first linear ridge 50 and the supporting shaft hole 30 and a spacing between the second linear ridge 52 and the supporting shaft hole 30 are equal to each other. The first linear ridge 50 and the second linear ridge 52 extend in a direction intersecting a direction (a direction "a" shown in FIG. 18) of pulling the connection member 18.

The circular ridge 32 is provided on the side of attaching the connection member 18 (the side of attaching the swinging member 14), and the first linear ridge 50 and the second linear ridge 52 extending toward the wire-like body pressing-down portion 24 are provided on a face opposed to the side of attaching the connection member 18 in the vertically extending portion of the wire gripper main body 12.

Procedures for attaching and detaching the wire gripper 10 constituted in the above manner to and from the wire-like body W will be explained below.

When the wire gripper 10 is lifted up such that the side of the stationary gripping body 20 is positioned on an upper side, the grip portion 140 is gripped with a hand of a person in a state that it is hung from the connection member 18.

At this time, the grip portion 140 is put on a palm of the hand of the person, a thenar eminence is caused to abut on the thenar eminence abutting portion 150, and the grip portion 140 is grasped by attaching the roots of the first finger, the second finger, and the third finger to the finger abutting portion 152.

Further, the side of the stationary gripping body 20 of the wire gripper 10 is raised up in a state where the attaching hole 142 of the grip portion 140 has been grasped.

Next, the wire-like body W is gripped by the stationary gripping body 20 and the movable gripping body 16 of the wire gripper 10.

The attaching hole 142 of the grip portion 140 is put on the palm of the hand of the person, the thenar eminence is caused to abut on the thenar eminence abutting portion 150, and a small finger is caused to abut on the small finger abutting portion 156 by attaching the roots of the first finger, the second finger, and the third finger to the finger abutting portion 152.

The first finger hooks the first-finger hooking portion 120, and the other fingers grasp the grip portion 140.

Further, the spacing between the first-finger hooking portion 120 and the grip portion 140 is reduced by pushing the connection member 18 to the side of pushing back (a direction shown in FIG. 18A) so as to approximate the first finger and the thumb to each other.

Thus, a state where the movable gripping body 16 is made sufficiently separate from the stationary gripping body 20 occurs, and it becomes easy to thread the wire-like body W between the stationary gripping body 20 and the movable gripping body 16.

The wire gripper 10 is carried to a predetermined side of the wire-like body W by grasping the grip portion 140 with the hand, as shown in FIG. 11A.

At this time, hanging to the wire-like body W is made easy by putting the spacing between the wire-like pressing down portion 24 of the stationary gripping body 20 and the wire-like holding portion 22 of the movable gripping body 16 in an opened state from each other, advancing the male screw portion 176 of the pressing body 172 constituting the connection member suppressing mechanism 170 to the side of pulling the connection member 18 to fasten the connection member 18 at a predetermined position of the connection member guiding portion 26 immovably and holding the spacing between the wire-like pressing down portion 24 of the stationary gripping body 20 and the wire-like body holding portion 22 of the movable gripping body 16 in an opened state from each other.

Next, as shown in FIG. 11B and FIG. 5, the wire gripper 10 is attached in a state where it has been hung to the wire-like body W by putting the wire gripper 10 in a state where the stationary gripping body 20 and the movable gripping body 16 are sufficiently spaced from each other, inserting the wire-like body W between the stationary gripping body 20 and the movable gripping body 16 and receiving the upper portion of the wire-like body W in the clamping groove 24a formed on the lower face of the stationary gripping body 20.

When attaching of the wire gripper 10 to the wire-like body W is applied to a wire-allocating work of a electric wire which is the wire-like body W, the wire grippers 10 are attached to two portions of the electric wire with a spacing corresponding to the length of wire tensioner serving to pull the wire from both sides thereof, respectively. Coupling means coupled to the wire gripper 10 utilizing the pulling hole 144 of the grip portion 140 formed on the side of the connection member 18 to be pulled are provided at both ends of the wire tensioner. A pulling force is imparted to the connection member 18 of the wire gripper 10 on the pulling side (the direction "a" shown in FIG. 18A) by performing operation for reducing the length after the wire tensioner are coupled to both ends.

Figure 12A:
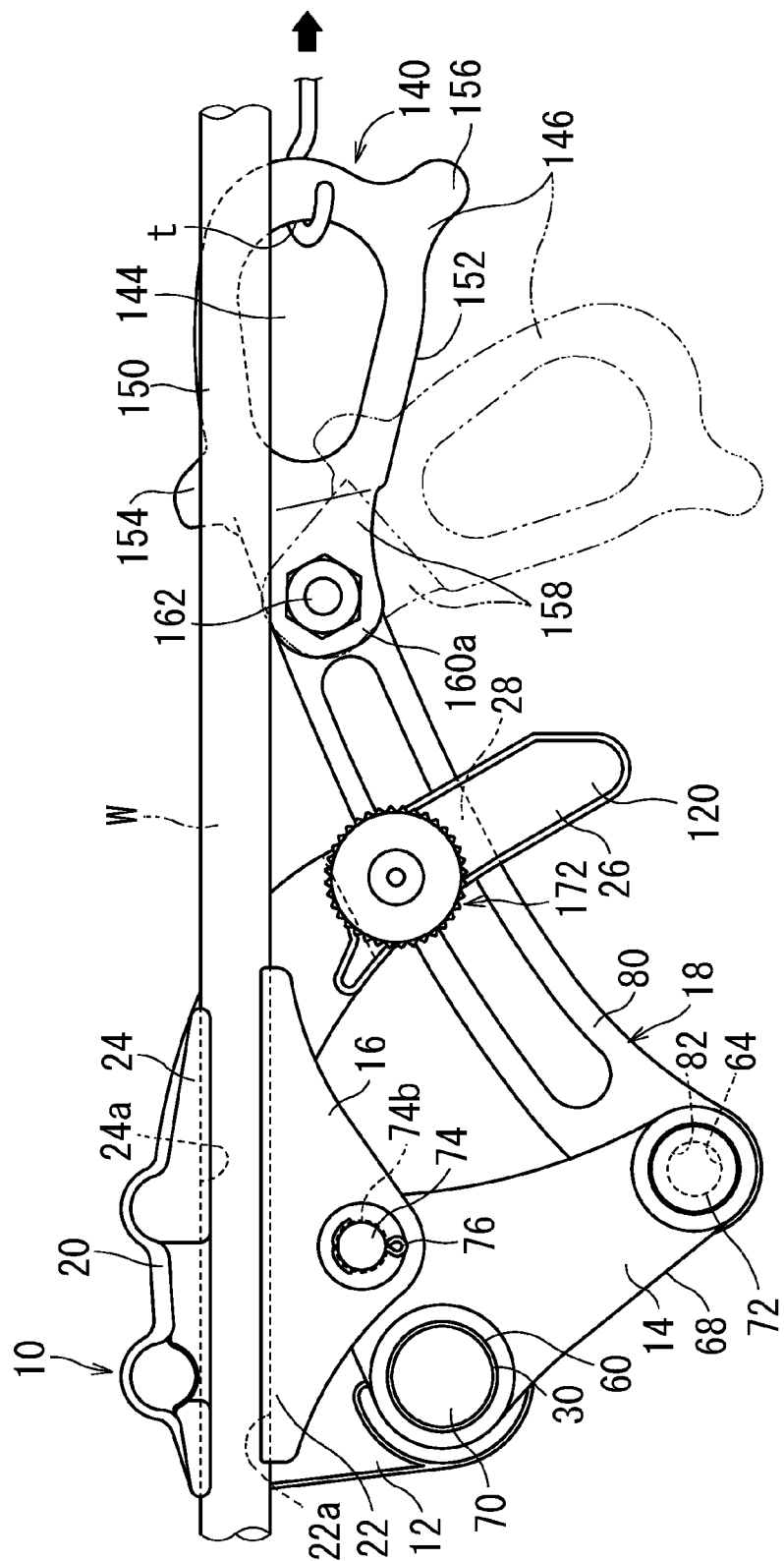
FIG. 12A is a front illustration view of a wire gripper which is an embodiment.

As shown in FIG. 12A, in the wire gripper 10, the swinging member 14 coupled with one end side of the connection member 18 is rotated in a direction c shown in FIG. 18A about the supporting shaft 70 serving as a fulcrum when the connection member 18 is pulled in the direction "a" shown in FIG. 18A. The movable gripping body 16 is pushed up in the direction of the stationary gripping body 20 according to rotation of the swinging member 14, the lower portion of the wire-like body W is received in the clamping groove 22a of the wire-like body holding portion 22, and the wire-like body W is clamped and gripped between the stationary gripping body 20 and the wire-like body holding portion 22 as shown in FIG. 12A.

When the pulling force is further imparted in the direction "a" shown in FIG. 18A by the wire tensioner, the wire-like body W gripped by the wire gripper 10 is pulled in the direction "a" shown in FIG. 18A, so that the wire grippers 10 on the both sides are pulled to approximate each other, the wire-like body W positioned between the wire grippers 10 on the both sides is put in a loosened state and a state where the allocating work can be performed is obtained.

Figure 12B:
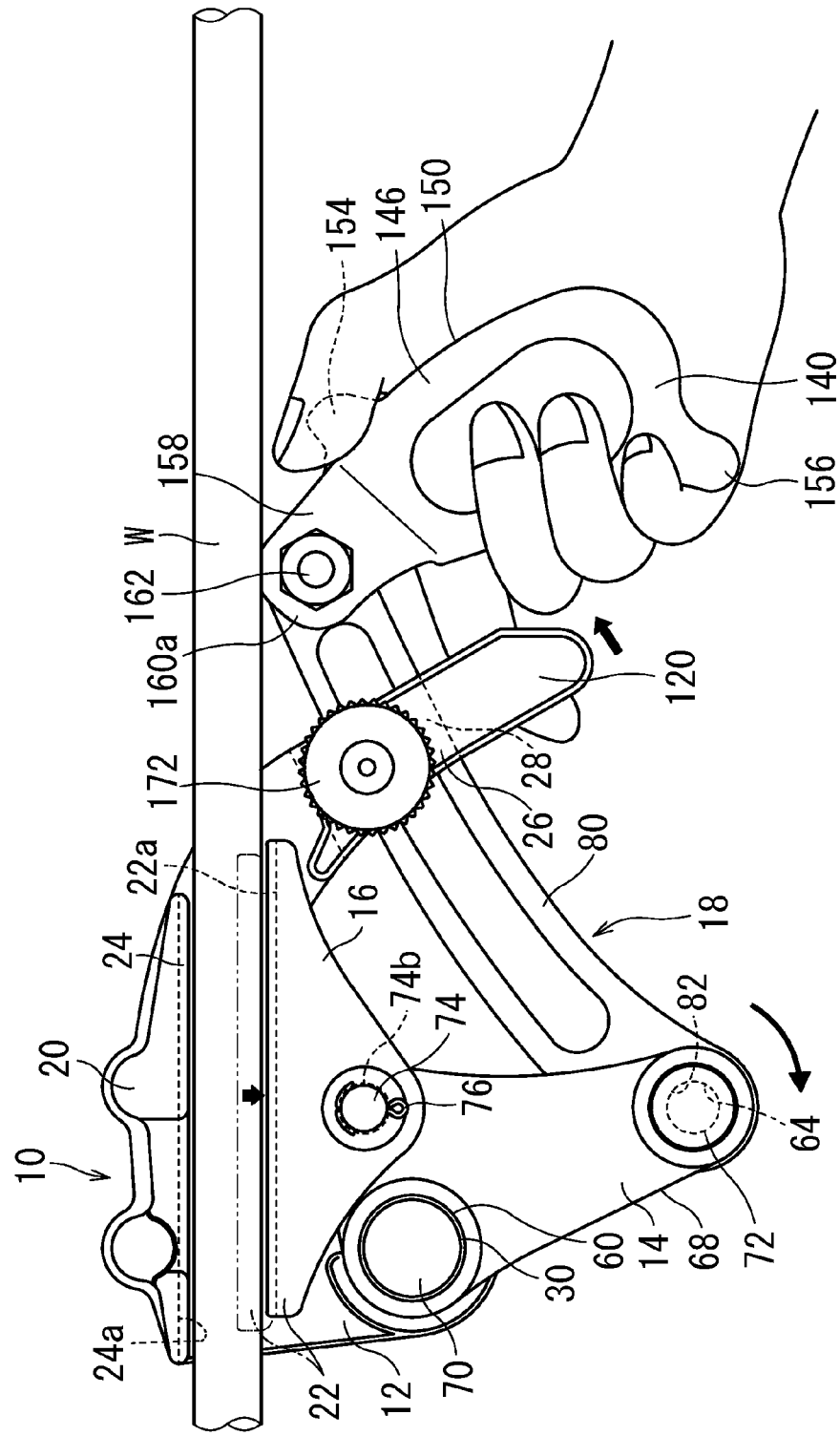
FIG. 12B is a front illustration view showing a use stage of a wire gripper which is an embodiment.
Figure 13A:
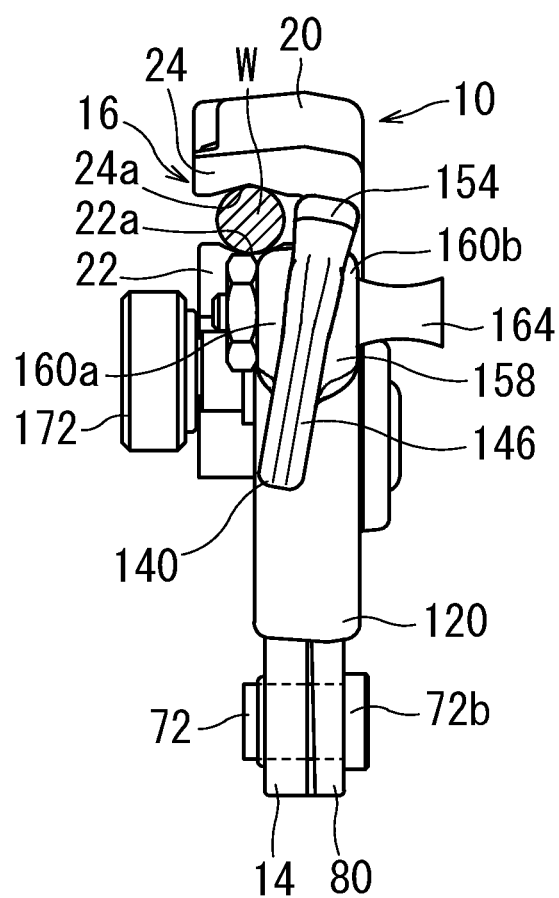
FIG. 13A is a side illustration view showing a use stage of a wire gripper which is an embodiment.
Figure 14A:
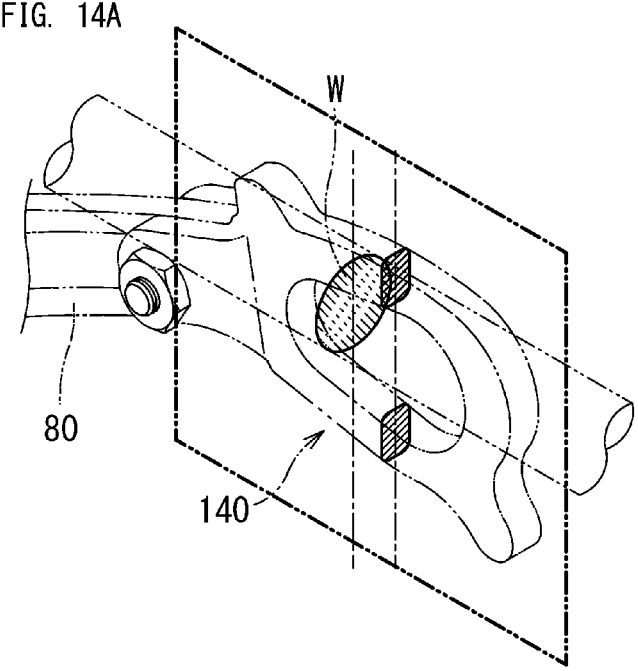
FIG. 14A is a perspective view of a grip portion of a wire gripper which is an embodiment.
Figure 14B:
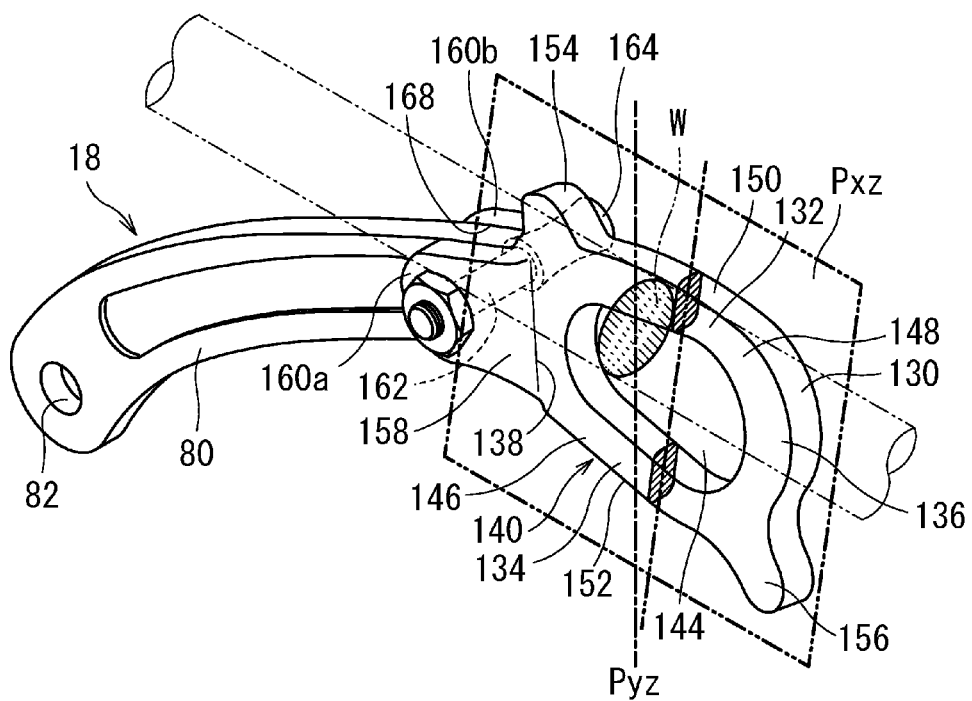
FIG. 14B is a perspective view of a grip portion of a wire gripper which is an embodiment.

As shown in FIG. 12B, when the wire gripper 10 attached to the wire-like body W is detached from the wire-like body W, since the movable gripping body 16 is separated from the wire-like body W by releasing the coupling state obtained by the wire tensioner coupled to the pulling hole 144 of the grip portion 140 or the like, rotating the handle 174 of the connection member suppressing mechanism 170 to move the pressing body 172 backward to release pressing to the connection member 18, gripping of the wire-like body W can be opened.

As described above, regarding the attaching work of the wire gripper 10, since all a work for attaching the wire gripper 10 to the wire-like body W to be performed by a worker and a work for coupling the pulling means such as the wire tensioner to the connection member 18 can be performed from the front side, a high place work and an dangerous work such as a electric wire-allocating work can be performed easily and safely.

When the wire gripper 10 attached to the wire-like body W is detached, since the movable gripping body 16 is separated from the wire-like body W by releasing the coupling state obtained by the wire tensioner coupled to the grip portion 140 on the side of the connection member 18 to be pulled or the like, gripping of the wire-like body W can be opened.

According to the above configuration, when the wire gripper 10 is attached to the wire-like body W, since the swinging member 14 is rotated in one direction by putting the stationary gripping body 20 on the wire-like body W and imparting an operating force to the swinging member 14 in one direction from the pulling means or the like, so that the movable gripping body 16 is moved to the side of the stationary gripping body 20, the wire-like body W can be gripped between the stationary gripping body 20 and the movable gripping body 16 so that the gripping state of the wire-like body W is maintained by restricting rotation of the swinging member 14 in the other direction according to advancing movement operation of the pressing body 172 of the connection member suppressing mechanism 170.

When the wire gripper 10 is detached, when rotation of the swinging member 14 in the other direction is released in order to release the operating force in the one direction imparted to the swinging member 14 by performing a retracting movement operation to the pressing body 172 of the connection member suppressing mechanism 170, since the swinging member 14 is rotated in the other direction so that gripping of the wire-like body W obtained by the movable gripping body 16 is released, the stationary gripping body 20 is detached from the wire-like body W and the wire gripper 10 can be detached.

Since the stationary gripping body 20 and the movable gripping body 16, the swinging member 14, and the connection member suppressing mechanism 170 for performing the attaching work and the detaching work of the wire gripper 10 to and from the wire-like body W are arranged on the same one direction side, the works for attaching and detaching the wire gripper 10 to and from the wire-like body W can be performed on the same one direction side. The work using the wire gripper 10 tends to become a high place work and a dangerous work, but the work can be performed easily and safely according to the operation from the same direction side.

As described above, the embodiment of the present invention has been disclosed above, but the present invention is not limited to this embodiment.

That is, various modifications can be applied to the above-described embodiment regarding a mechanism, a shape, a material, the number of parts, a position, an arrangement or the like without deviating from the technical idea and a scope of the object of the present invention, and these are included in the present invention.

Another wire gripper which is another embodiment different from the wire gripper 10 shown in FIG. 1 will be explained mainly with reference to FIG. 15 to FIG. 17.

Figure 1B:
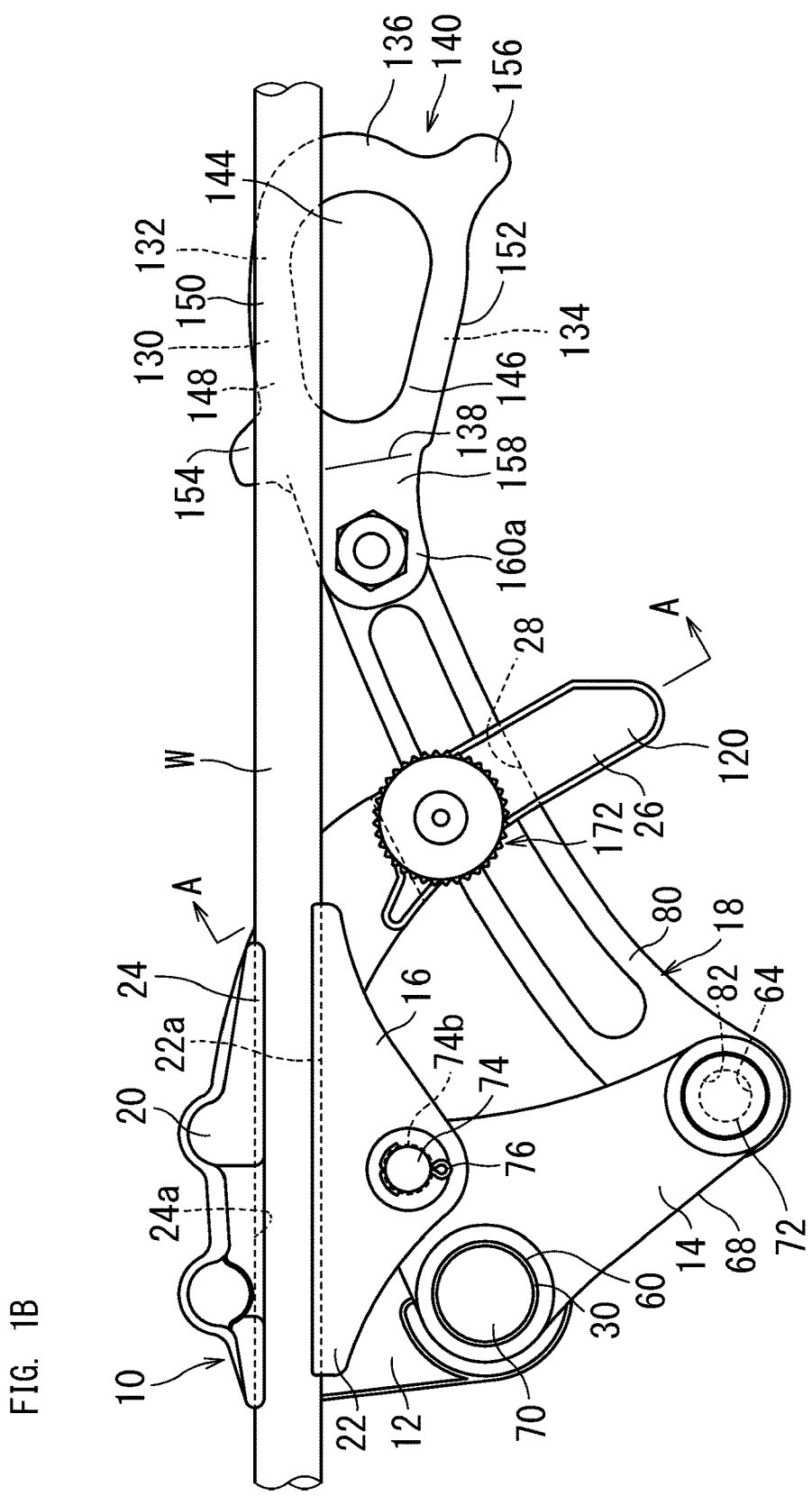
FIG. 1B is a front illustration view showing a whole configuration of a wire gripper which is an embodiment according to the present invention.
Figure 2A:
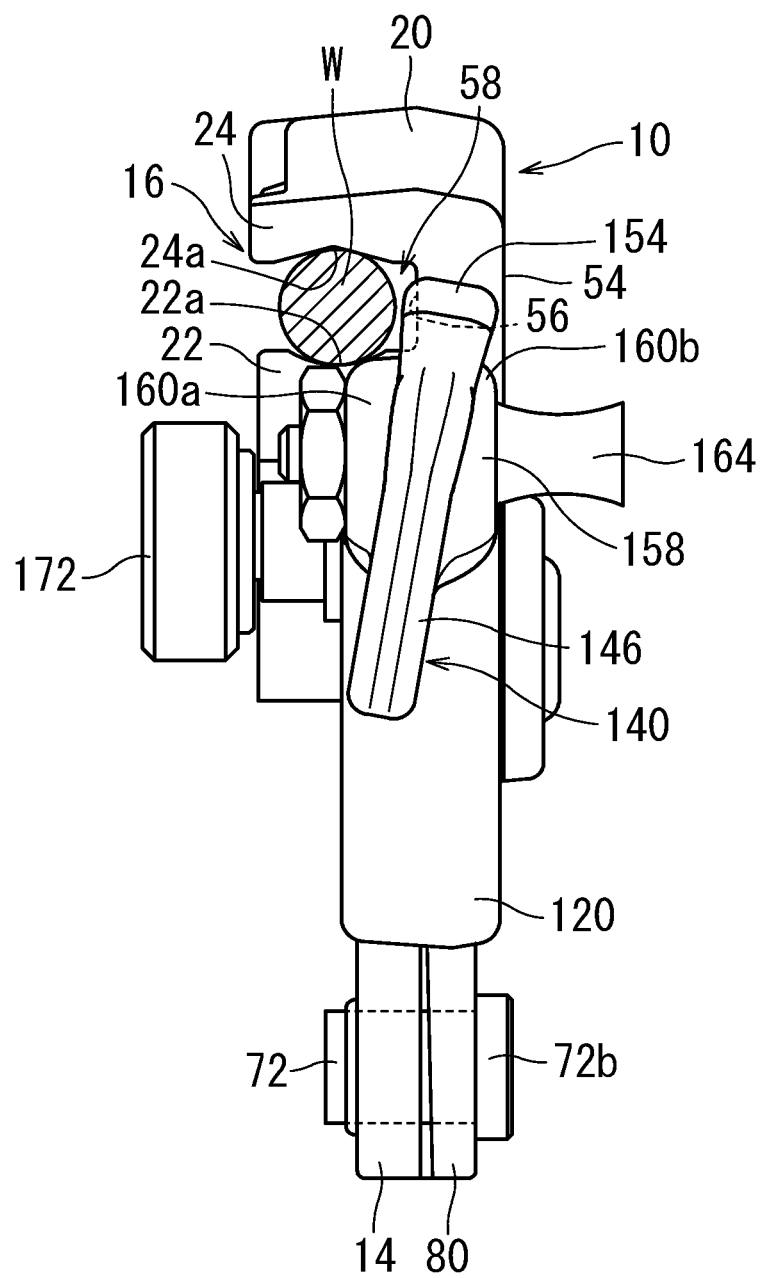
FIG. 2A is a right side illustration view of a wire gripper main body.
Figure 2B:
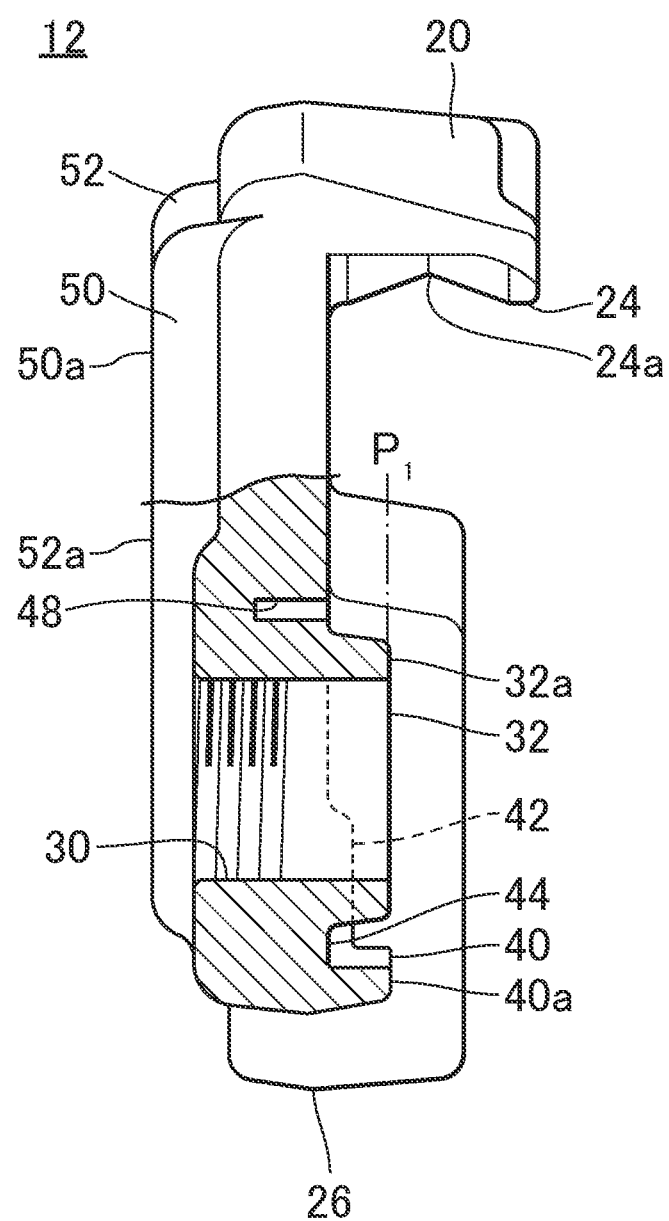
FIG. 2B is a left side illustration view of the wire gripping main body partially sectioned.
Figure 3:
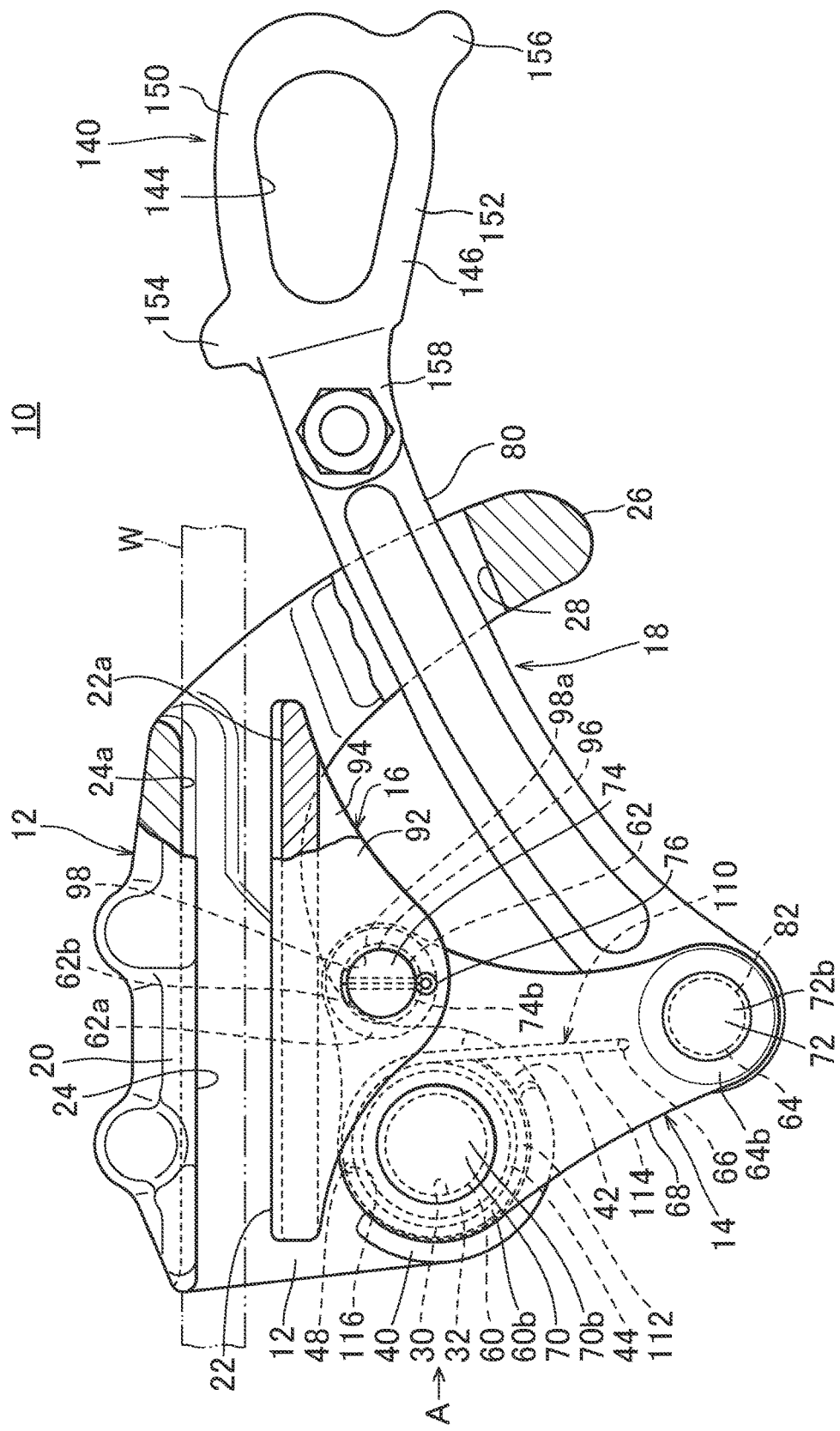
FIG. 3 is a front illustration view showing an operation state of the wire gripper.
Figure 4:
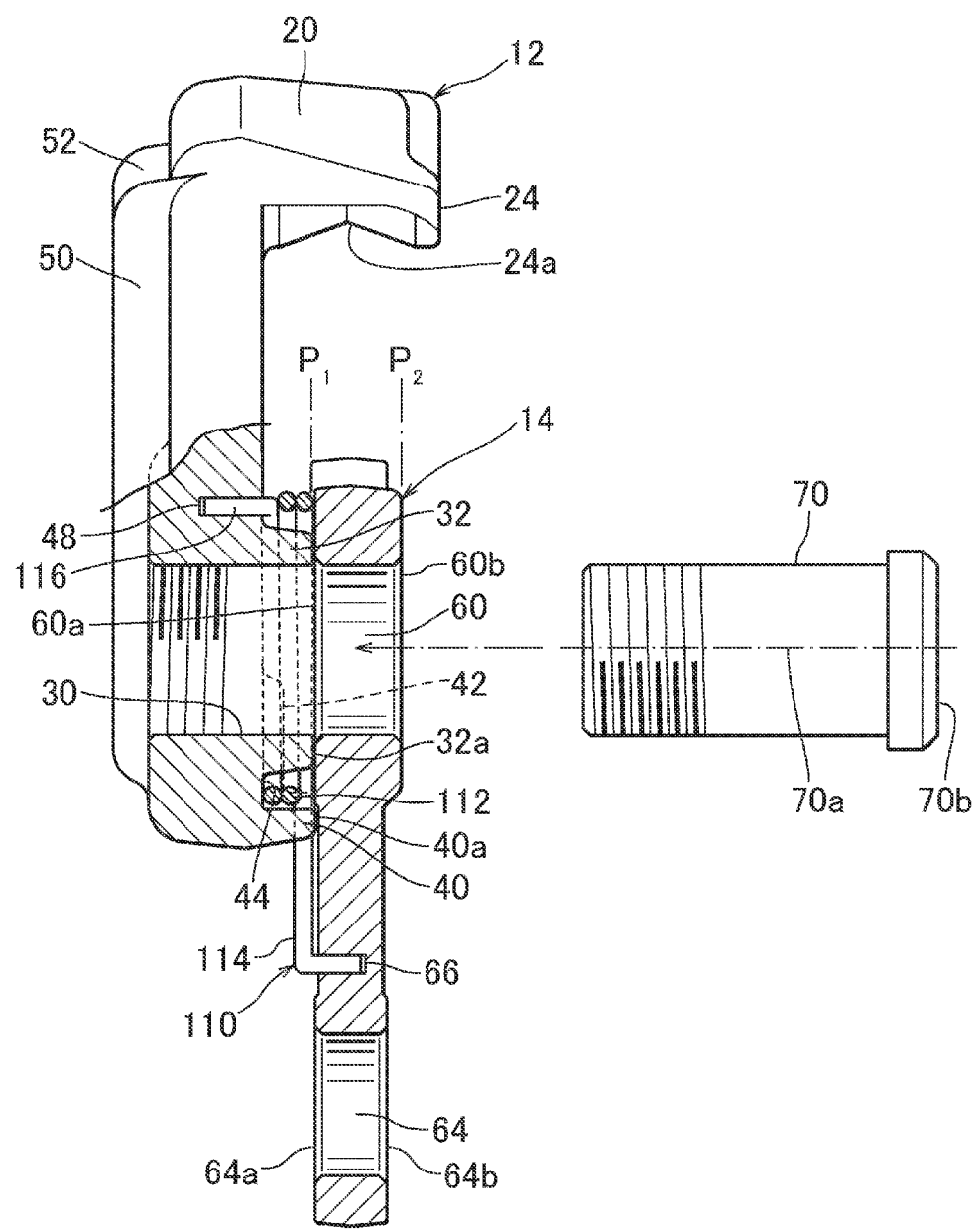
FIG. 4 is a sectional illustration view showing an attaching state of the wire gripper main body and a swinging member
Figure 15:
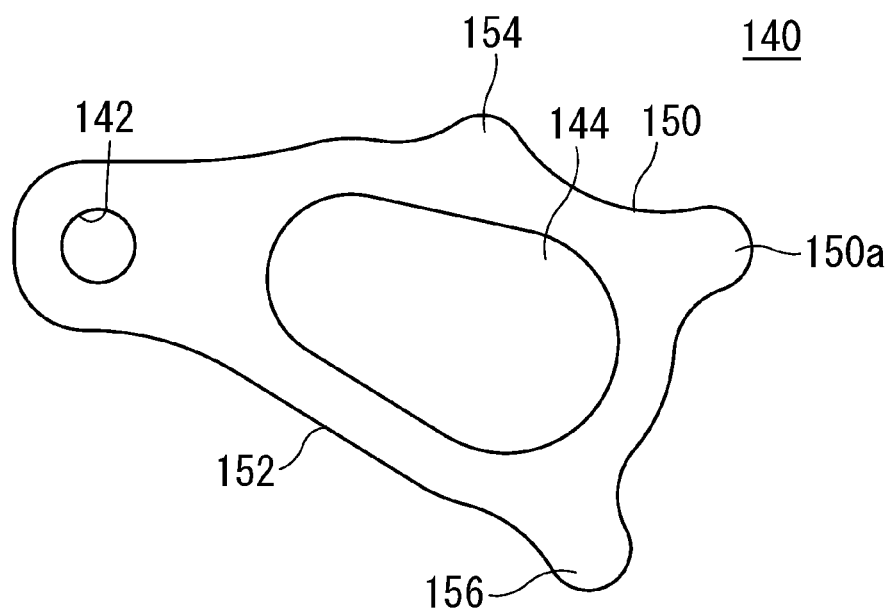
FIG. 15 is a front view of a grip portion of a wire gripper which is an embodiment.

FIG. 15 is an illustration view of a wire gripper which is another embodiment different from the wire gripper 10 shown in FIG. 1.

A grip portion 140 has a thenar eminence supporting portion 150a for supporting a thenar eminence provided below the thenar eminence abutting portion 150 in a projecting manner.

The thenar eminence supporting portion 150a abuts on the near side of the thenar eminence abutting on the thenar eminence abutting portion 150 to hold the grip portion 140 when a person grasps the grip portion 140 with his/her hand.

Figure 16:
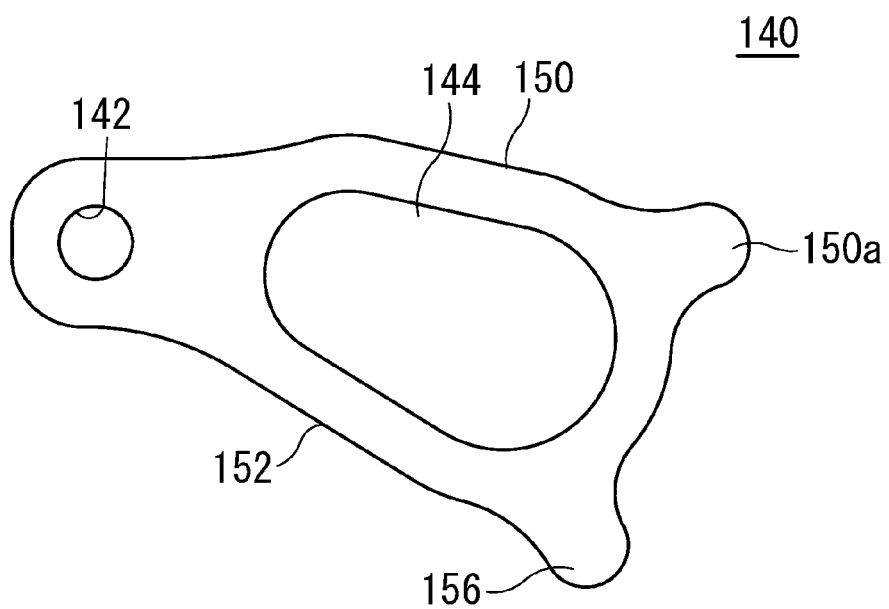
FIG. 16 is a front view of a grip portion of a wire gripper which is an embodiment.

As shown in FIG. 16, the grip portion 140 may be configured so as not to form the thumb abutting portion 154. When the grip portion 140 shown in FIG. 12 is gripped with a hand of a person, the side of the thenar eminence is held by the thenar eminence abutting portion 150 and the thenar eminence supporting portion 150a, the roots of the second finger and the third finger are held by the finger abutting portion 152, and the small-finger is held by the small finger abutting portion 156.

Figure 17:
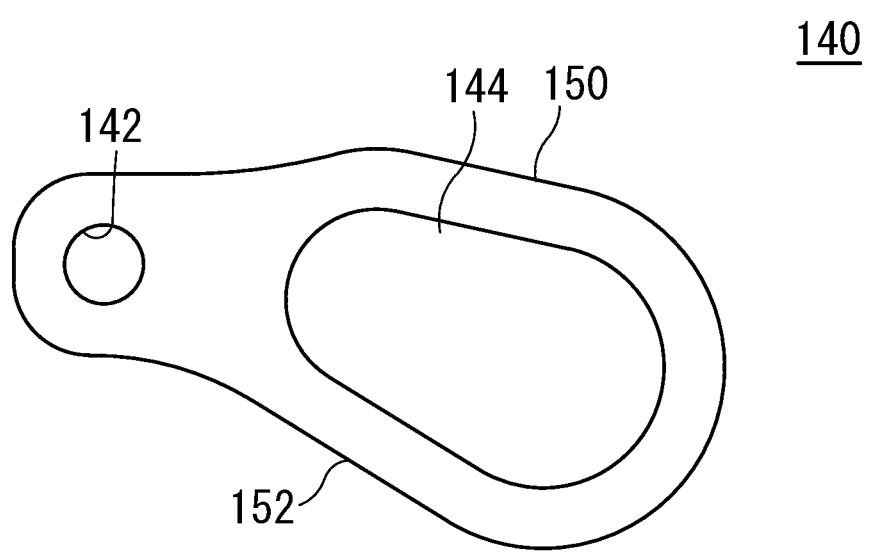
FIG. 17 is a front view of a grip portion of a wire gripper which is an embodiment.

As shown in FIG. 17, the grip portion 140 may be configured so as not to form the thumb abutting portion 154 and the small-finger abutting portion 156.

When the grip portion 140 shown in FIG. 17 is gripped with a hand of a person, the side of the thenar eminence is held by the thenar eminence abutting portion 150, and the roots of the second finger and the third finger are held by the finger abutting portion 152.

The connection member 18 and the grip portion 140 are different from those of the wire gripper 10 of the embodiment shown in FIG. 1 described above and they may be changed in the following manner.

Next, modified embodiments of the connection member 18 and the grip portion 140 will be explained with reference to FIG. 19 to FIG. 24.

The stationary gripping body 20 of the wire gripper main body 12 is provided with a vertical face 56 forming a gripping hole portion 58 in a base portion 54 of the wire gripper main body 12. The wire-like body pressing-down portion 24 is provided toward the near side in a direction orthogonal to the vertical face 56 above the vertical face 56 in a projecting manner.

The clamping groove 24a of the wire-like body pressing-down portion 24 of the stationary gripping body 20 of the wire gripper main body 12 is opposed to the clamping groove 22a of the wire-like body holding portion 22 of the movable gripping body member 16 gripping the wire-like body W, and a gripping hole portion 58 gripping the wire-like body W is formed therebetween.

The gripping hole portion 58 gripping the wire-like body W has an approximately vertically-sectional U shape or a channel shape surrounded by the clamping groove 24a of the wire-like body pressing down portion 24 regarding an upper side thereof, the clamping groove 22a of the wire-like body holding portion 22 regarding a lower side thereof, and the vertical face 56 of the wire-like body pressing-down portion 24 regarding a depth side.

The connection member 18 is formed with a curved portion 284 curved to the principal face around the grip portion attaching hole 86 in the vicinity of the grip portion 140 close to the grip portion 140 rather than the central portion (the fulcrum F: a point contacting with the guide hole 28 of the connection member guiding portion 26) of the longitudinal direction of the connection member 18, and a section from the curved portion 284 to the vicinity of the grip portion attaching hole 86 (namely, a rear end side which is a region on the side close to the wire-like body W) is constituted as a detour region 288.

The detour region 288 is configured to be positioned on the opposite side of the wire-like body W gripped between the stationary gripping body 20 and the movable gripping body 16 when the connection member 18 is pulled.

The detour region 288 and the attaching portion 158 of the grip portion 140 extend in parallel to the Pyz including the left and right axis which is a direction in which the stationary gripping body 20 and the movable gripping body 16 extend, where the connection member attaching projecting portion 160a and the connection member attaching projecting portion 160b pass through the connection member 18, the stationary gripping body 20 and the movable gripping body 16.

The grip portion 140 is configured such that the grip portion main body 146 on the free end side rather than the connection member attaching projecting portion 160a and the connection member attaching projecting portion 160b, namely, a region around the pulling hole 144 formed with the pulling hole 144 is parallel to the inclined reference plane Pxz passing through a region around the pulling hole 144 formed with the pulling hole 144.

When the detour region 288 and the grip portion 140 on the rear end side is stretched from the central portion (the fulcrum F: the point contacting with the guide hole 28 of the connection member guiding portion 26) in the longitudinal direction of the connection member 18 extending along the inclined reference plane Pxz, the detour region 288 is curved to be positioned on the far side of the wire-like body W gripped between the stationary gripping body 20 and the movable gripping body 16 and it extends up to the rear end straightly.

The detour region 288 is parallel to the front end side (from the fulcrum F to the swinging member attaching hole 82) from the curved portion 284.

In this embodiment, the detour region 288 of the connection member 18 is configured to be positioned on the farther side beyond the far side of clamping groove 22a of the wire-like body holding portion 22 and the clamping groove 24a of the wire-like body pressing-down portion 24, namely, the depth side where the far side of the wire-like body W is positioned.

The detour region 288 is positioned on the far side of the wire-like body W which is the opposite side to an entrance of the gripping hole portion 58 of the wire-like body W formed between the clamping groove 24a of the wire-like body pressing-down portion 24 of the stationary gripping body 20 of the wire gripper main body 12 and the clamping groove 22a of the wire-like body holding portion 22 of the movable gripping body 16.

The grip portion 140 is configured such that the grip portion 140 does not interfere with the wire-like body W by approximating the center of the pulling hole 144 to the center of the wire-like body W.

The grip portion 140 can pull the wire-like body W without inclination of the wire gripper 10 and bending the wire-like body W, since the hook or the belt of the wire tensioner attached to the pulling hole 144 is pulled at a position where the pulling side of the connection member main body 80 and the attaching portion 158 is closed to the center of the wire-like body W when the hook or the belt is pulled.

The grip portion 140 and the connection member 18 are formed such that when the hook or the belt of the wire tensioner is hooked to the pulling hole 144 of the grip portion 140 and it is pulled, a starting point t on which a pulling force acts is located at a position close to the wire-like body W.

Further, the grip portion 140 and the connection member 18 are formed such that when the hook or the belt of the wire tensioner is hooked and it is pulled, the starting point t on which the pulling force of the attaching hole 142 of the grip portion 140 acts is located at a position close to the wire-like body W.

Formation is made such that the starting point t on which the pulling force of the attaching hole 142 of the grip portion 140 acts is located at a height close to the height of the wire-like body holding portion 22 of the movable gripping body 16.

The starting point t on which the pulling force acts is located at the reference plane Pyz including the left and right axis which is a direction in which the stationary gripping body 20 and the movable gripping body 16 extend and it is located in a direction in which the connection member main body 80 extends.

The ring portion 130 of the grip portion 140 is an approximately oval shape in a front view and it is provided with an upper contour portion 132, a lower contour portion 134, and a side contour portion 136.

The ring portion 130 is formed in an approximately egg shape, a region position on the side of the connection member main body 80 being narrow and a free end region on the opposite side to the side of the connection member main body 80 bulging.

The upper contour portion 132 forming an upper region of the grip portion main body 146 and a lower region of the lower contour portion 134 have a taper shape expanding a spacing therebetween along a direction from a boundary portion 138 between the attaching portion 158 and the ring portion 130 toward the free end side.

The lower contour portion 134 is configured such that the side contour portion 136 positioned on the free end side falling slightly downward beyond the lower end edge of the attaching portion 158.

The grip portion main body 146 is configured such that principal faces (a face on the front face side and a face on a back face side) intersect principal faces (a face on the front face side and a face on a back face side) of the connection member main body 80 obliquely.

The above-described grip portion main body 146 is formed with an inclined portion 148 inclined to the principal face around the grip portion attaching hole 86 and a principal faces (a face on the front face side and a face on a back face side) of the attaching portion 158, and the inclined portion 148 is constituted as a retracting region retracting the wire-like body W.

The inclined portion 148 is constituted to be positioned on the opposite side to the wire-like body W gripped between the stationary gripping body 20 and the movable gripping body 16 at a time of pulling the connection member 18.

The attaching portion 158 of the grip portion 140 extends in a parallel to the reference plane Pyz including a left and right axis which is a direction in which the stationary gripping body 20 and the movable gripping body 16 extend, where the connection member attaching projecting portion 160a and a connection member attaching projecting portion 160b passes through the connection member 18, the stationary gripping body 20 and the movable gripping body 16.

The grip portion 140 is configured such that the grip portion main body 146 on the free end side beyond the connection member attaching projecting portion 160a and the connection member attaching projecting portion 160b, namely, a region around the pulling hole 144 formed with the pulling hole 144, that is, the inclined portion 148 becomes parallel to the inclined reference plane Pxz passing through a region around the pulling hole 144 formed with the pulling hole 144.

In this embodiment, the inclined portion 148 of the grip portion main body 146 is configured such that the sides of the upper contour portion 132 and the side contour portion 136 are positioned on the farther side beyond the far side of the clamping groove 22a of the wire-like body holding portion 22 and the clamping groove 24a of the wire-like body pressing-down portion 24, namely, the depth side where the far side of the wire-like body W is positioned.

The inclined portion 148 is positioned on the far side of the wire-like body which is the opposite side to the entrance of the gripping hole portion 58 of the wire-like body W formed between the clamping groove 24a of the wire-like body pressing-down portion 24 of the stationary gripping body 20 of the wire gripper main body 12 and the clamping groove 22a of the wire-like body holding portion 22 of the movable gripping body 16.

With such a configuration, when the wire gripper 10 according to the present invention can pull the wire-like body W approximately in parallel to the direction in which the wire-like body W extends when the wire-like body W is pulled by the wire tensioner by hooking the hook or the belt of the wire tensioner, so that the wire-like body W can be pulled without inclining the wire gripper 10 or bending the wire-like body W.

The starting point t (the starting point on which a tension acts according to operation of the wire tensioner such as a hook) on which a tension acts of the attaching hole 142 of the grip portion 140 arranged on the end portion of the connection member 18 can be moved on the center line of the pulling portion of the wire-like body W without any obstruction, the starting point t on which the tension acts of the attaching hole 142 of the grip portion 140 and the center line of the pulling portion of the wire-like body W coincide with each other easily, and a bent point does not occur on the wire-like body W.

Therefore, according to the wire gripper 10 of this embodiment, a wiring work can be performed without imparting a bending habit to the wire-like body W or without damaging an inner metal wire of the wire-like body W.

This can also be applied to a case where the thickness of the wire-like body W changes approximately similarly

INDUSTRIAL APPLICABILITY

The wire gripper according to the present invention can be applied to not only an electrical wire but also a wire-like body pulling a grapevine trellis or tree, or the like.

EXPLANATION OF REFERENCE SIGN 10 wire gripper
12 wire gripper main body
14 swinging member
16 movable gripping body
18 connection member
20 stationary gripping body
22 wire-like body holding portion
22a, 24a clamping groove
24 wire-like body pressing-down portion
26 connection member guiding portion
28 guide hole
30 supporting shaft hole
32a, 40a top portion
32, 40 ridge
42 space
44 spring groove
48, 66 catching hole
50 first linear ridge
52 second linear ridge
54 base portion
56 vertical face
58 gripping hole portion
60 stationary gripping body attaching hole
60a, 62a, 64a top portion of bulging portion around a far-side hole
60b, 62b, 64b top portion of bulging portion around a near-side hole
62 movable gripping body attaching hole
64 connection member attaching hole
68 front end edge
70 supporting shaft
70a, 72a, 74a axial center
70b, 72b, 74b flange portion
72 connection member swinging shaft
74 movable gripping body swinging shaft
76 cotter pin
80 connection member main body
80a projecting portion 82 swinging member attaching hole
284 curved portion
86 grip portion attaching hole
288 detour region
92 one swinging member attaching portion
94 the other swinging member attaching portion
96 one swinging member attaching hole
98 the other swinging member attaching hole
98a step difference portion
110 biasing member
112 coil portion
114 first hooking portion
116 second hooking portion
120 first-finger hooking portion
130 ring portion
132 upper contour portion
134 lower contour portion
136 side contour portion
138 boundary portion
140 grip portion
142 attaching hole
144 pulling hole
146 grip portion main body
148 inclined portion
150 thenar eminence abutting portion
150a thenar eminence supporting portion
152 finger abutting portion
154 thumb abutting portion
156 small-finger abutting portion
158 attaching portion
160a, 160b connection member attaching projecting portion
162 grip portion rotation shaft
164 finger hooking portion
168 connection member inserting recessed portion
170 connection member suppressing mechanism
172 pressing body
174 handle
176 male screw portion
178 spring washer
180 female screw hole
190 slope face
W wire-like body
Pyz reference plane
Pxz inclined reference plane
F fulcrum

The invention claimed is:
1. A wire gripper comprising:
a wire gripper main body which includes a stationary gripping body having a wire-like body pressing-down portion;
a swinging member swingably attached to the wire gripper main body by a supporting shaft;
a movable gripping body having a wire-like body holding portion and swinging toward the wire-like body pressing-down portion of the stationary gripping body according to swinging of the swinging member;
a connection member coupled to the swinging member by a connection member swinging shaft and swinging the swinging member;
a grip portion rotatably attached to the connection member;
a connection member guiding portion for guiding the connection member when the connection member is pulled, the connection member guiding portion being provided with the wire gripper main body; and
a first-finger hooking portion extending in a first direction opposed to the stationary gripping body, the first-finger hooking portion being provided with the wire gripper main body, wherein
the connection member is rotationally attached with at a side of the grip portion, and
the grip portion has a shape grasped with a hand of a user, and is configured
to abut a palm of on the user's hand at an end edge opposite to a side with which the first-finger hooking portion is provided, and which is a side of facing the end edge of the first-finger hooking portion, when the grip portion is hung toward the first direction of the first-finger hooking portion, and
to extend in a second direction in which the connection member extends when the connection member is pulled.
2. A wire gripper comprising:
a wire gripper main body which includes a stationary gripping body having a wire-like body pressing-down portion;
a swinging member swingably attached to the wire gripper main body by a supporting shaft;
a movable gripping body having a wire-like body holding portion for holding a wire-like body and swinging toward the wire-like body pressing-down portion of the stationary gripping body according to swinging of the swinging member;
a connection member coupled to the swinging member by a connection member swinging shaft and swinging the swinging member;
a connection member guiding portion for guiding the connection member when the connection member is pulled, the connection member guiding portion being provided with the wire gripper main body;
a first-finger hooking portion extending in a direction opposed to the stationary gripping body, the first-finger hooking portion being provided with the connection member guiding portion;
a grip portion is swingably attached onto the connection member to a side of pulling the connection member so as to be opposed to the first-finger hooking portion, wherein
the grip portion includes a grip portion main body, an attaching portion, and the pulling hole, the grip portion main body having an inclined portion inclined at a principal face of the attaching portion such that the grip portion does not interfere with the wire-like body by approximating a center of the pulling hole to the wire-like body pressed by the wire-like body pressing-down portion,
the inclined portion is configured to be positioned at a far side to the wire-like body gripped between the wire gripper main body and the movable gripping body at a time of pulling the connection member so as to project toward a near side of the wire-like body, and
the grip portion is configured so as to provide a tension for pulling the connection member.
3. A wire gripper, comprising:
a wire gripper main body which includes a stationary gripping body having a wire-like body pressing-down portion;
a swinging member swingably attached to the wire gripper main body by a supporting shaft;
a movable gripping body having a wire-like body holding portion and swinging toward the wire-like body press- ing-down portion of the stationary gripping body according to swinging of the swinging member; and a connection member coupled to the swinging member by a connection member swinging shaft and swinging the swinging member;

a connection member guiding portion for guiding the connection member when the connection member is pulled, the connection member guiding portion being provided with the connection member;

a connection member suppressing mechanism for suppressing movement of the connection member by being fastened being locked or being stopped in a pressing manner so as not to change a spacing between the wire-like body pressing-down portion of the stationary gripping body and the wire-like body holding portion of the movable gripping body, the connection member suppressing mechanism being provided with the connection member or the connection member guiding portion, and including a pressing body, wherein the connection member has a slope face gradually pulling out toward the pressing body along such a direction in which a principal face of the connection member pressed by the pressing body moves a side to which the connection member is pulled, the connection member guiding portion includes a through-hole as a guide hole, the guide hole having a hole wall face, the pressing body, for pressing on the slope face of the connection member, is inserted in the through-hole, and the connection member is configured not to move in a pulling-back direction by pressing a face thereof opposite to a face thereof pressed by the pressing body to the hole wall face of the guide hole.

\* \* \* \* \*